United States Patent
Yang et al.

(10) Patent No.: US 9,425,943 B2
(45) Date of Patent: *Aug. 23, 2016

(54) METHOD FOR TRANSMITTING CONTROL INFORMATION AND APPARATUS FOR SAME

(71) Applicant: LG ELECTRONICS INC., Seoul (KR)

(72) Inventors: Suckchel Yang, Anyang-si (KR); Joonkui Ahn, Anyang-si (KR); Dongyoun Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/802,710

(22) Filed: Jul. 17, 2015

(65) Prior Publication Data

US 2015/0327252 A1 Nov. 12, 2015

Related U.S. Application Data

(63) Continuation of application No. 14/038,558, filed on Sep. 26, 2013, now Pat. No. 9,118,448, which is a continuation of application No. 14/007,933, filed as application No. PCT/KR2012/007677 on Sep. 24, (Continued)

(30) Foreign Application Priority Data

Sep. 24, 2012 (KR) .................. 10-2012-0106158

(51) Int. Cl.
*H04B 7/00* (2006.01)
*H04L 5/00* (2006.01)
(Continued)

(52) U.S. Cl.
CPC .............. *H04L 5/0055* (2013.01); *H04B 7/26* (2013.01); *H04L 1/1607* (2013.01); *H04L 1/18* (2013.01);

(Continued)

(58) Field of Classification Search
None
See application file for complete search history.

(56) References Cited

U.S. PATENT DOCUMENTS 8,897,187 B2 * 11/2014 Yang .................. H04L 5/001 370/310
9,118,448 B2 * 8/2015 Yang .................... H04L 1/1861

(Continued)

FOREIGN PATENT DOCUMENTS

| CN | 101924624 | 12/2010 |
| CN | 101958778 | 1/2011 |

(Continued)

OTHER PUBLICATIONS

PCT International Application No. PCT/KR2012/007677, Written Opinion of the International Searching Authority dated Feb. 14, 2013, 12 pages.

(Continued)

*Primary Examiner* — Kevin C Harper
(74) *Attorney, Agent, or Firm* — Lee Hong Degerman Kang & Waimey; Jonathan Kang; Jeffrey Lotspeich

(57) ABSTRACT

A wireless communication system is disclosed. A method for transmitting uplink control information in a wireless communication system supporting carrier aggregation and operating in TDD includes: generating a first HARQ-ACK (hybrid automatic repeat request-acknowledgement) set for a first cell using a value M; generating a second HARQ-ACK set for a second cell using the value M; and transmitting a bit value corresponding to a third HARQ-ACK set including the first HARQ-ACK set and the second HARQ-ACK set in an uplink subframe n, wherein M=max(M1, M2), max(M1, M2) representing a value being equal to or larger than not smaller between M1 and M2, wherein M1 corresponds to the number of downlink subframes corresponding to the uplink subframe n in the first cell, and M2 corresponds to the number of downlink subframes corresponding to the uplink subframe n in the second cell, wherein the first cell and the second cell have different UL-DL configurations.

16 Claims, 12 Drawing Sheets

Related U.S. Application Data 2012, now Pat. No. 8,897,187.

(60) Provisional application No. 61/538,141, filed on Sep. 23, 2011, provisional application No. 61/658,386, filed on Jun. 11, 2012, provisional application No. 61/671,104, filed on Jul. 13, 2012, provisional application No. 61/696,312, filed on Sep. 4, 2012.

(51) Int. Cl.
| | | |
|---|---|---|
| *H04L 1/18* | (2006.01) | |
| *H04L 5/14* | (2006.01) | |
| *H04B 7/26* | (2006.01) | |
| *H04W 72/04* | (2009.01) | |
| *H04L 1/16* | (2006.01) | |
| *H04W 88/02* | (2009.01) | |
| *H04L 1/00* | (2006.01) | |

(52) U.S. Cl.
CPC ............... *H04L 1/1861* (2013.01); *H04L 5/14* (2013.01); *H04W 72/0413* (2013.01); *H04L 1/0073* (2013.01); *H04L 1/1812* (2013.01); *H04L 5/001* (2013.01); *H04W 88/02* (2013.01)

(56) References Cited

U.S. PATENT DOCUMENTS

| | | |
|---|---|---|
| 2008/0298497 A1 | 12/2008 | Cho et al. |
| 2011/0141878 A1 | 6/2011 | Che et al. |
| 2012/0269103 A1 | 10/2012 | Papasakellariou et al. |
| 2013/0279377 A1* | 10/2013 | Zhao ........................ H04L 5/001 370/280 |
| 2013/0301433 A1 | 11/2013 | Yin et al. |

FOREIGN PATENT DOCUMENTS

| | | |
|---|---|---|
| CN | 101981854 | 2/2011 |
| CN | 102098146 | 6/2011 |
| CN | 102098151 | 6/2011 |

OTHER PUBLICATIONS

U.S. Appl. No. 14/007,933, Notice of Allowance dated Apr. 8, 2014, 8 pages.
The State Intellectual Property Office of the People's Republic of China Application Serial No. 201280033769.2, Office Action dated Jan. 5, 2016, 6 pages.
Ericsson, et al., "PUCCH Resource Mapping," 3GPP TSG-RAN WG1 #69, R1-121988, May 2012, 3 pages.
European Patent Office Application Serial No. 12833266.5, Office Action dated May 17, 2016, 6 pages.
Media Tek Inc, "HARQ Feedback Mechanism in CA with Different TDD Configurations," 3GPP TSG-RAN WG1 #66, R1-112349, Aug. 2011, 5 pages.
3rd Generation Partnership Project (3GPP), "Technical Specification Group Radio Access Network; Evolved Universal Terrestrial Radio Access (E-UTRA); Physical Layer Procedures (Release 10)," 3GPP TS 36.213 V10.2.0, Jun. 2011, 24 pages.
Samsung, "Discussion on PUCCH HARQ-ACK Transmission," 3GPP TSG-RAN WG1 #69, R1-122220, May 2012, 5 pages.
LG Electronics, "ACK/NACK Transmission for TDD CA with Different UL-DL Configurations," 3GPP TSG-RAN WG1 #70, R1-123508, Aug. 2012, 8 pages.

* cited by examiner

FIG. 11

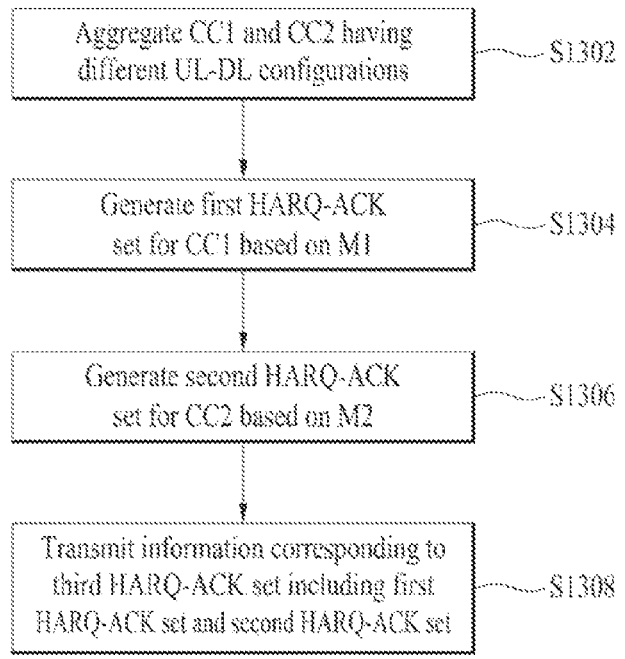
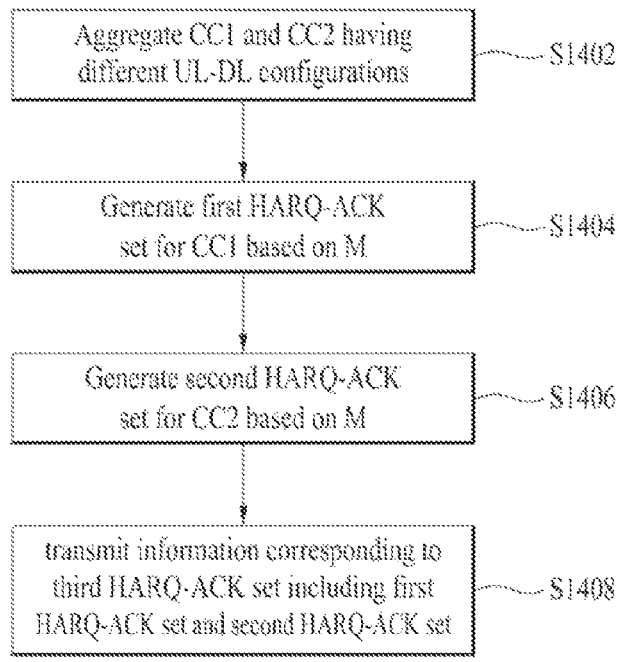
* M = max (M1, M2)

METHOD FOR TRANSMITTING CONTROL INFORMATION AND APPARATUS FOR SAME

CROSS-REFERENCE TO RELATED APPLICATIONS

This application is a continuation of U.S. patent application Ser. No. 14/038,558, filed on Sep. 26, 2013, now U.S. Pat. No. 9,118,448, which is a continuation of U.S. patent application Ser. No. 14/007,933, filed on Sep. 26, 2013, now U.S. Pat. No. 8,897,187, which is the National Stage filing under 35 U.S.C. §371 of International Application No. PCT/KR2012/007677, filed on Sep. 24, 2012, which claims the benefit of earlier filing date and right of priority to Korean Application No. KR10-2012-0106158, filed on Sep. 24, 2012, and also claims the benefit of U.S. Provisional Application Nos. 61/696,312, filed on Sep. 4, 2012, 61/671,104, filed on Jul. 13, 2012, 61/658,386, filed on Jun. 11, 2012, and 61/538,141, filed on Sep. 23, 2011 the contents of which are all hereby incorporated by reference herein in their entirety.

TECHNICAL FIELD

The present invention relates to a wireless communication system, and more specifically, to a method for transmitting control information and a device for the same.

BACKGROUND ART

Wireless communication systems have been widely deployed to provide various types of communication services including voice and data services. In general, a wireless communication system is a multiple access system that supports communication among multiple users by sharing available system resources (e.g. bandwidth, transmit power, etc.) among the multiple users. The multiple access system may adopt a multiple access scheme such as Code Division Multiple Access (CDMA), Frequency Division Multiple Access (FDMA), Time Division Multiple Access (TDMA), Orthogonal Frequency Division Multiple Access (OFDMA), or Single Carrier Frequency Division Multiple Access (SC-FDMA).

DISCLOSURE

Technical Problem

An object of the present invention devised to solve the problem lies in a method for efficiently transmitting control information in a wireless communication system and a device for the same. Another object of the present invention is to provide a method for efficiently transmitting uplink control information in a TDD (Time Division Duplex) system and efficiently managing resources for the same and a device for the same. The technical problems solved by the present invention are not limited to the above technical problems and those skilled in the art may understand other technical problems from the following description.

Technical Solution

The object of the present invention can be achieved by providing a method for transmitting uplink control information in a wireless communication system supporting carrier aggregation and operating in TDD (time division duplex), the method including: generating a first HARQ-ACK (hybrid automatic repeat request-acknowledgement) set for a first cell using a value M; generating a second HARQ-ACK set for a second cell using the value M; and transmitting a bit value corresponding to a third HARQ-ACK set including the first HARQ-ACK set and the second HARQ-ACK set in an uplink subframe n, wherein M=max(M1, M2), max(M1, M2) representing a value not smaller between (e.g., a value being larger than or equal to) M1 and M2, wherein M1 corresponds to the number of downlink subframes corresponding to the uplink subframe n in the first cell, and M2 corresponds to the number of downlink subframes corresponding to the uplink subframe n in the second cell, wherein the first cell and the second cell have different UL-DL configurations.

In another aspect of the present invention, provided herein is a communication device configured to transmit uplink control information in a wireless communication system supporting carrier aggregation and operating in TDD (time division duplex), the communication device including: a radio frequency (RF) unit; and a processor, wherein the processor is configured to generate a first HARQ-ACK set for a first cell using a value M, to generate a second HARQ-ACK set for a second cell using the value M, and to transmit a bit value corresponding to a third HARQ-ACK set including the first HARQ-ACK set and the second HARQ-ACK set in an uplink subframe n, wherein M=max(M1, M2), max(M1, M2) representing a value not smaller between M1 and M2, wherein M1 corresponds to the number of downlink subframes corresponding to the uplink subframe n in the first cell, and M2 corresponds to the number of downlink subframes corresponding to the uplink subframe n in the second cell, wherein the first cell and the second cell have different UL-DL configurations.

The first cell may be a primary cell (PCell) and the second cell is a secondary cell (SCell).

When M1≠1 and M2≠0, the first HARQ-ACK set may be followed by the second HARQ-ACK set in the third HARQ-ACK set.

When M1=0 and M2≠0, the second HARQ-ACK set may be followed by the first HARQ-ACK set in the third HARQ-ACK set.

When M1<M2, the first HARQ-ACK set may include M2 HARQ-ACK responses, and M2-M1 HARQ-ACK responses at the back of the first HARQ-ACK set may be set as DTX.

The bit value corresponding to the third HARQ-ACK set may be transmitted using a specific PUCCH resource corresponding to the third HARQ-ACK set, from among a plurality of PUCCHs.

The bit value corresponding to the third HARQ-ACK set may be transmitted through a PUSCH.

Advantageous Effects

According to the present invention, control information can be efficiently transmitted in a wireless communication system. Specifically, uplink control information can be efficiently transmitted in a TDD system and resources for the same can be efficiently managed.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings:

FIG. 11 illustrates an HD (half duplex)-TDD CA scheme;

FIG. 13 illustrates a TDD CA A/N transmission process according to an embodiment of the present invention;

FIG. 14 illustrates a TDD CA A/N transmission process according to another embodiment of the present invention.

BEST MODE

Figure 1:
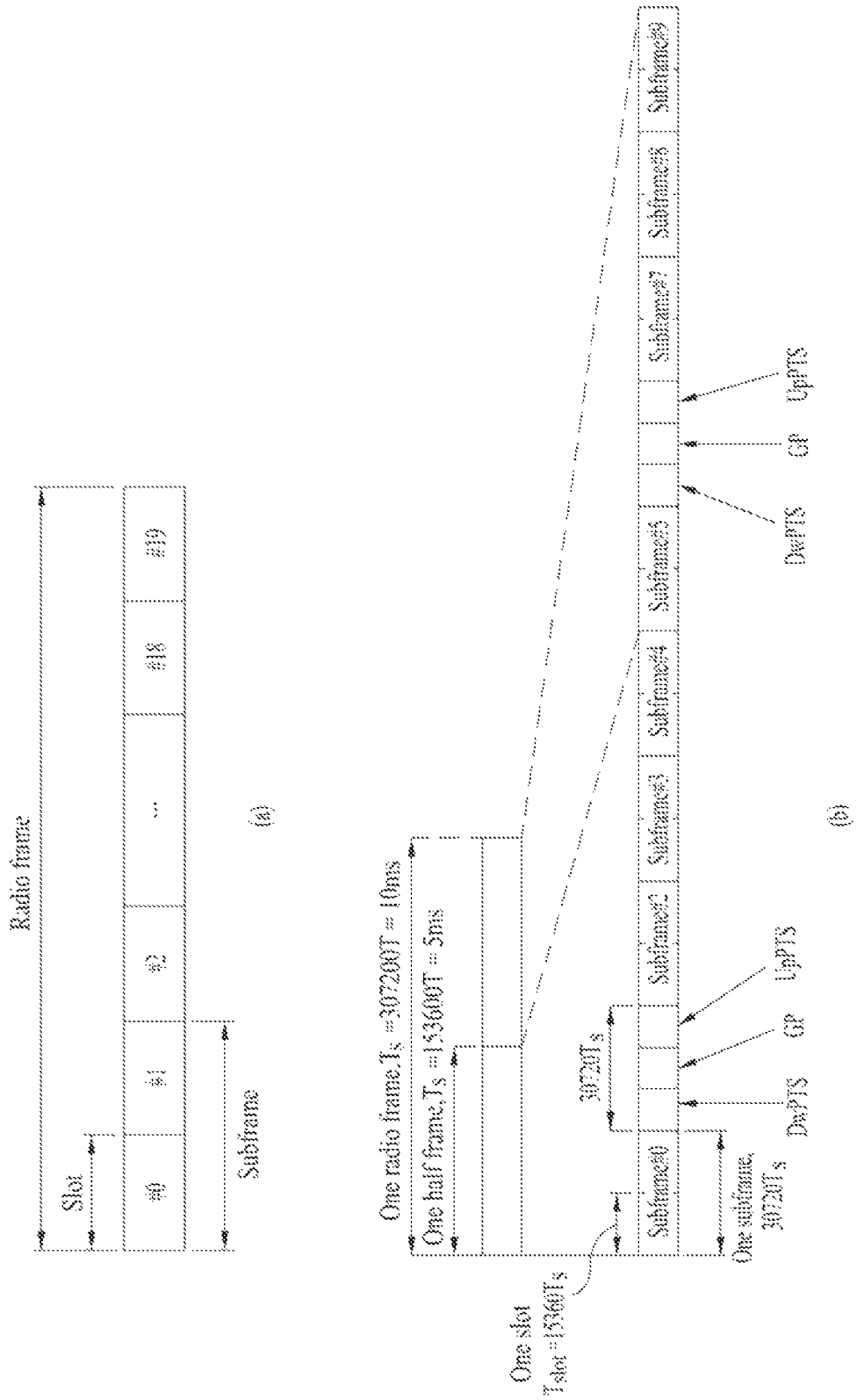
FIG. 1 illustrates a radio frame structure.

Embodiments of the present invention are applicable to a variety of wireless access technologies such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, Evolved UTRA (E-UTRA). UTRA is a part of Universal Mobile Telecommunications System (UMTS). $3^{rd}$ Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) is an evolution of 3GPP LTE.

While the following description is given, centering on 3GPP LTE/LTE-A to clarify the description, this is purely exemplary and thus should not be construed as limiting the present invention.

The terms used in the specification will now be described.

HARQ-ACK (Hybrid Automatic Repeat request-Acknowledgement): this represents an acknowledgment response to downlink transmission (e.g. PDSCH or SPS release PDCCH), that is, an ACK/NACK/DTX response (simply, ACK/NACK response, ACK/NACK). The ACK/NACK/DTX response refers to ACK, NACK, DTX or NACK/DTX. HARQ-ACK for a CC or HARQ-ACK of a CC refers to an ACK/NACK response to downlink transmission related to (e.g. scheduled for) the CC. A PDSCH can be replaced by a transport block (TB) or a codeword.

PDSCH: this corresponds to a DL grant PDCCH. The PDSCH is used interchangeably with a PDSCH w/ PDCCH in the specification.

SPS release PDCCH: this refers to a PDCCH indicating SPS release. A UE performs uplink feedback of ACK/NACK information about an SPS release PDCCH.

SPS PDSCH: this is a PDSCH transmitted on DL using a resource semi-statically set according to SPS. The SPS PDSCH has no DL grant PDCCH corresponding thereto. The SPS PDSCH is used interchangeably with a PDSCH w/o PDCCH in the specification.

PUCCH (Physical Uplink Control Channel) index: this corresponds to a PUCCH resource. The PUCCH index indicates a PUCCH resource index, for example. The PUCCH resource index is mapped to at least one of an orthogonal cover (OC), a cyclic shift (CS) and PRB.

ARI (ACK/NACK Resource Indicator): this is used to indicate a PUCCH resource. For example, the ARI can be used to indicate a resource change value (e.g. offset) for a specific PUCCH resource (group) (configured by a higher layer). Otherwise, the ARI can be used to indicate a specific PUCCH resource (group) index in a PUCCH resource (group) set (configured by a higher layer). The ARI can be included in a TPC (Transmit Power Control) field of a PDCCH corresponding to a PDSCH on an SCC. PUCCH power control is performed through a TPC field in a PDCCH (i.e. a PDCCH corresponding to a PDSCH on a PCC) that schedules the PCC. Furthermore, the ARI can be included in a TPC field of a PDCCH other than a PDCCH that schedules a specific cell (e.g. PCell) while having a DAI (Downlink Assignment Index) initial value. The ARI is used with a HARQ-ACK resource indication value.

DAI (Downlink Assignment Index): this is included in DCI transmitted through a PDCCH. The DAI can indicate an order value or counter value of a PDCCH. A value indicated by a DAI field of a DL grant PDCCH is called a DL DAI and a value indicated by a DAI field of a UL grant PDCCH is called a UL DAI for convenience.

Implicit PUCCH resource: this represents a PUCCH resource/index linked to a lowest CCE index of a PDCCH that schedules a PCC or is transmitted through the PCC (refer to Equation 1).

Explicit PUCCH resource: this can be indicated using the ARI.

CC scheduling PDCCH: this indicates a PDCCH that schedules a PDSCH on a corresponding CC. That is, this represents the PDCCH corresponding to the PDSCH on the CC.

PCC (Primary Component Carrier) PDCCH: this indicates a PDCCH that schedules a PCC. That is, the PCC PDCCH represents a PDCCH corresponding to a PDSCH on the PCC. The PCC PDCCH is transmitted only on the PCC on the assumption that cross-carrier scheduling is not permitted. The term PCC is used interchangeably with PCell (Primary Cell).

SCC (Secondary Component Carrier) PDCCH: this indicates a PDCCH that schedules an SCC. That is, the SCC PDCCH represents a PDCCH corresponding to a PDSCH on the SCC. The SCC PDCCH can be transmitted on a CC (e.g. PCC) other than the corresponding SCC when cross-carrier scheduling is permitted for the SCC. The SCC PDCCH is transmitted only on the SCC when cross-carrier scheduling is not permitted for the SCC. The term SCC is used interchangeably with SCell (Secondary Cell).

Cross-CC scheduling: this refers to an operation of transmitting a PDCCH that schedules an SCC through a CC (e.g. PCC) other than the SCC. Cross-CC scheduling means an operation of scheduling/transmitting all PDCCHs only through a PCC when only the PCC and one SCC are present.

Non-cross-CC scheduling: this refers to an operation of scheduling/transmitting a PDCCH that schedules each CC through the corresponding CC.

FIG. 1 illustrates a radio frame structure. In a cellular OFDM wireless packet communication system, uplink/downlink data packet transmission is performed on a subframe-by-subframe basis. A subframe is defined as a predetermined time interval including a plurality of OFDM symbols. LTE(-A) supports a type-1 radio frame structure for FDD (frequency division duplex) and a type-2 radio frame structure for TDD (time division duplex).

FIG. 1(a) illustrates a type-1 radio frame structure. A downlink subframe includes 10 subframes each of which includes 2 slots in the time domain. A time for transmitting a subframe is defined as a transmission time interval (TTI). For example, each subframe has a length of 1 ms and each slot has a length of 0.5 ms. A slot includes a plurality of OFDM symbols in the time domain and includes a plurality of resource blocks (RBs) in the frequency domain. Since downlink uses OFDM in LTE(-A), an OFDM symbol represents a symbol period. The OFDM symbol may be called an SC-FDMA symbol or symbol period. An RB as a resource allocation unit may include a plurality of consecutive subcarriers in one slot.

The number of OFDM symbols included in one slot may depend on Cyclic Prefix (CP) configuration. When an OFDM symbol is configured with the normal CP, for example, the number of OFDM symbols included in one slot may be 7. When an OFDM symbol is configured with the extended CP, the number of OFDM symbols included in one slot may be 6.

FIG. 1(b) illustrates a type-2 radio frame structure. The type-2 radio frame includes 2 half frames. Each half frame includes 5 subframes. One subframe consists of 2 slots.

Table 1 shows UL-DL configurations (UL-DL Cfg) of subframes in a radio frame in the TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe.

The special subframe includes DwPTS (Downlink Pilot TimeSlot), GP (Guard Period), and UpPTS (Uplink Pilot TimeSlot). DwPTS is a period reserved for downlink transmission and UpPTS is a period reserved for uplink transmission.

Table 2 shows DwPTS/GP/UpPTS lengths according to special subframe configurations. In Table 2, Ts denotes sampling time.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |

TABLE 2-continued

| Special subframe configuration | Normal cyclic prefix in downlink | | | Extended cyclic prefix in downlink | | |
|---|---|---|---|---|---|---|
| | DwPTS | UpPTS Normal cyclic prefix in uplink | UpPTS Extended cyclic prefix in uplink | DwPTS | UpPTS Normal cyclic prefix in uplink | UpPTS Extended cyclic prefix in uplink |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The radio frame structure is exemplary and the number of subframes, the number of slots and the number of symbols in a radio frame can vary.

Figure 2:
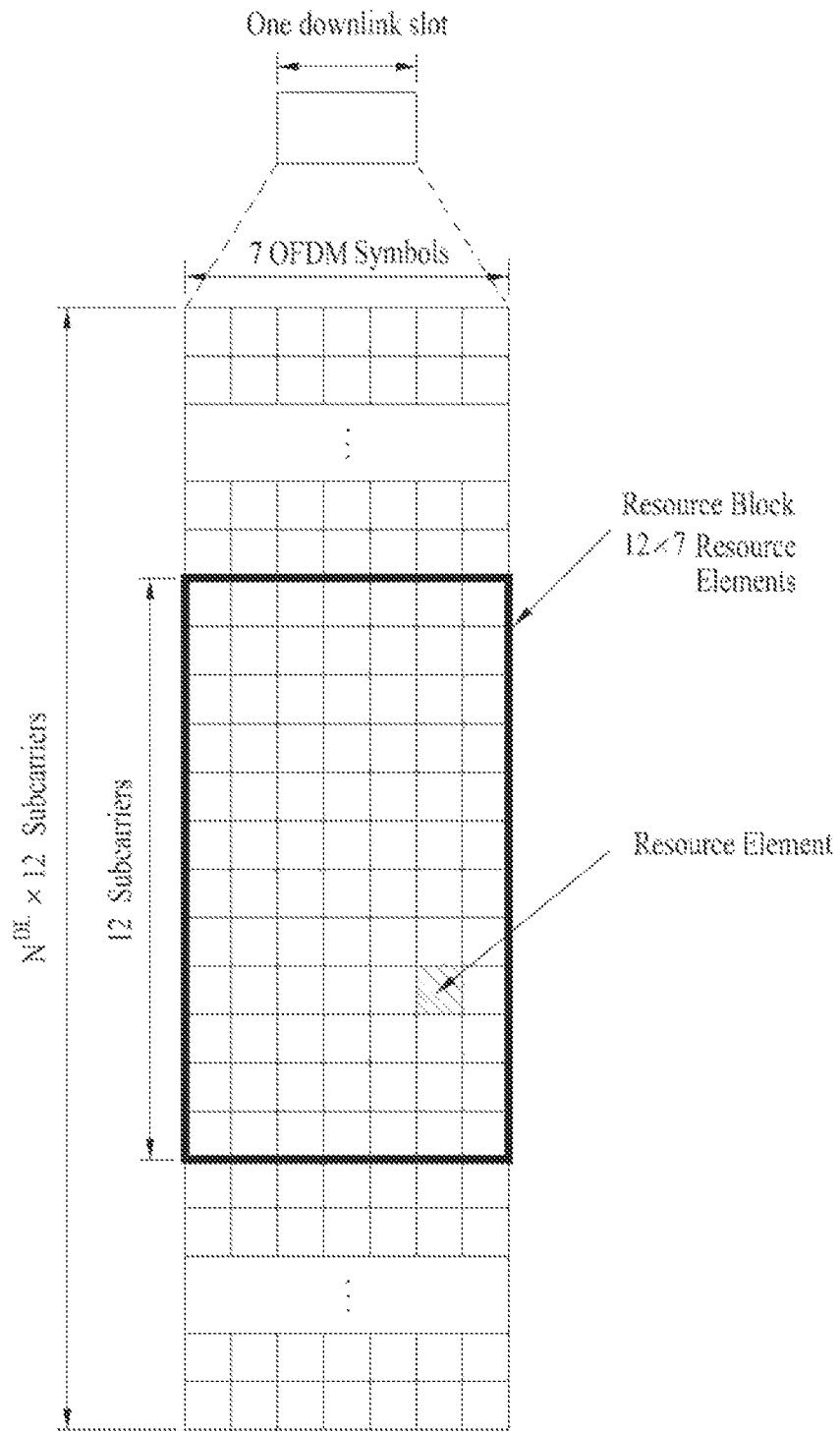
FIG. 2 illustrates a resource grid of a downlink slot.

FIG. 2 illustrates a resource grid of a downlink slot.

Referring to FIG. 2, a downlink slot includes a plurality of OFDM symbols in the time domain. One downlink slot may include 7(6) OFDM symbols, and one resource block (RB) may include 12 subcarriers in the frequency domain. Each element on the resource grid is referred to as a resource element (RE). One RB includes 12×7(6) REs. The number $N_{RB}$ of RBs included in the downlink slot depends on a downlink transmit bandwidth. The structure of an uplink slot may be same as that of the downlink slot except that OFDM symbols by replaced by SC-FDMA symbols.

Figure 3:
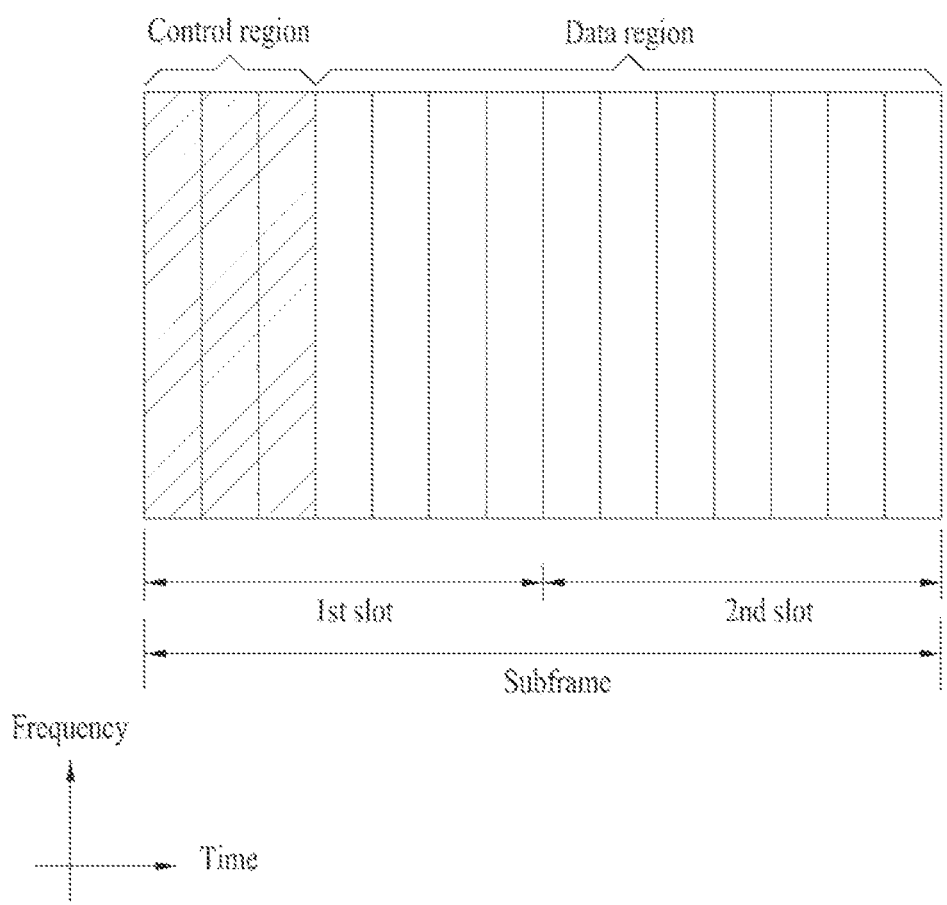
FIG. 3 illustrates a downlink subframe structure.

FIG. 3 illustrates a downlink subframe structure.

Referring to FIG. 3, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. Examples of downlink control channels used in LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/not-acknowledgment (NACK) signal.

Control information transmitted through the PDCCH is referred to as downlink control information (DCI). Formats 0, 3, 3A and 4 for uplink and formats 1, 1A, 1B, 1C, 1D, 2, 2A, 2B and 2C for downlink are defined as DCI formats. The DCI formats selectively include information such as hopping flag, RB allocation, MCS (Modulation Coding Scheme), RV (Redundancy Version), NDI (New Data Indicator), TPC (Transmit Power Control), cyclic shift DM RS (Demodulation Reference Signal), CQI (Channel Quality Information) request, HARQ process number, TPMI (Transmitted Precoding Matrix Indicator), PMI (Precoding Matrix Indicator) confirmation according as necessary.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

Figure 4:
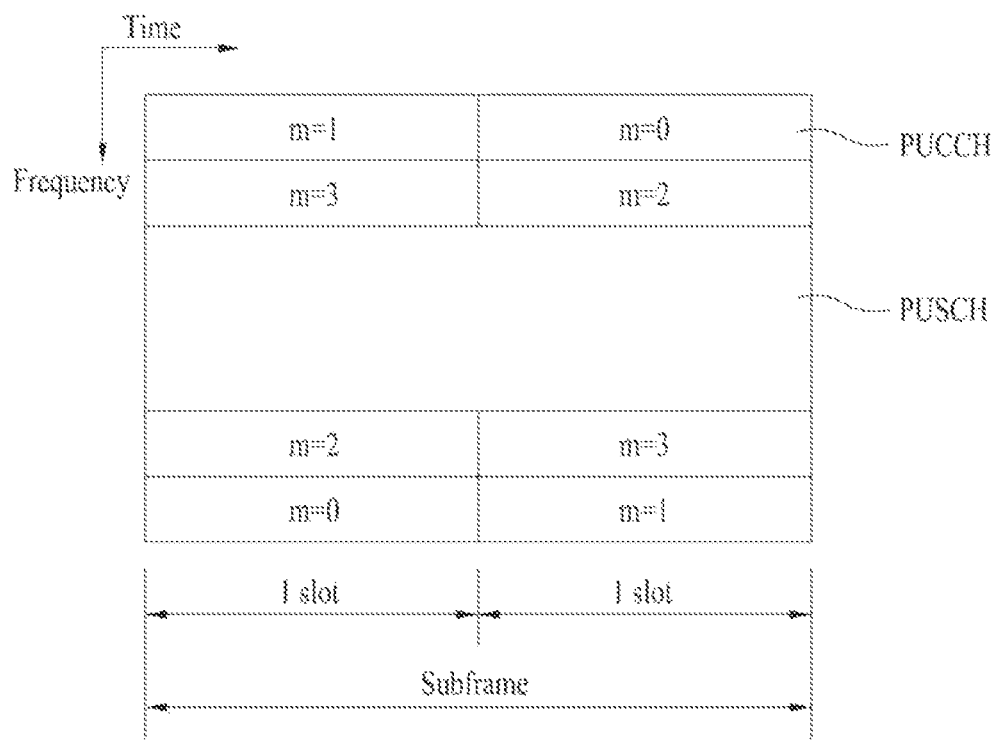
FIG. 4 illustrates an uplink subframe structure.

FIG. 4 illustrates an uplink subframe structure.

Referring to FIG. 4, an uplink subframe includes a plurality of (e.g. 2) slots. A slot may include different numbers of SC-FDMA symbols according to CP lengths. The uplink subframe is divided into a control region and a data region in the frequency domain. The data region is allocated with a PUSCH and used to carry a data signal such as audio data. The control region is allocated a PUCCH and used to carry uplink control information (UCI). The PUCCH includes an RB pair located at both ends of the data region in the frequency domain and hopped in a slot boundary.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords.

Channel Quality Indicator (CQI): This is feedback information about a downlink channel. Feedback information regarding Multiple Input Multiple Output (MIMO) includes Rank Indicator (RI) and Precoding Matrix Indicator (PMI). 20 bits are used for each subframe.

Table 3 shows the mapping relationship between PUCCH formats and UCI in LTE.

TABLE 3

| PUCCH format | UCI (Uplink Control Information) |
|---|---|
| Format 1 | SR (Scheduling Request) (non-modulated waveform |
| Format 1a | 1-bit HARQ ACK/NACK (SR exist/non-exist) |
| Format 1b | 2-bit HARQ ACK/NACK (SR exist/non-exist) |
| Format 2 | CQI (20 coded bits) |
| Format 2 | CQI and 1- or 2-bit HARQ ACK/NACK (20 bits) (corresponding to only extended CP) |
| Format 2a | CQI and 1-bit HARQ ACK/NACK (20 + 1 coded bits) |
| Format 2b | CQI and 2-bit HARQ ACK/NACK (20 + 2 coded bits) |
| Format 3 (LTE-A) | HARQ ACK/NACK + SR (48 bits) |

Figure 5:
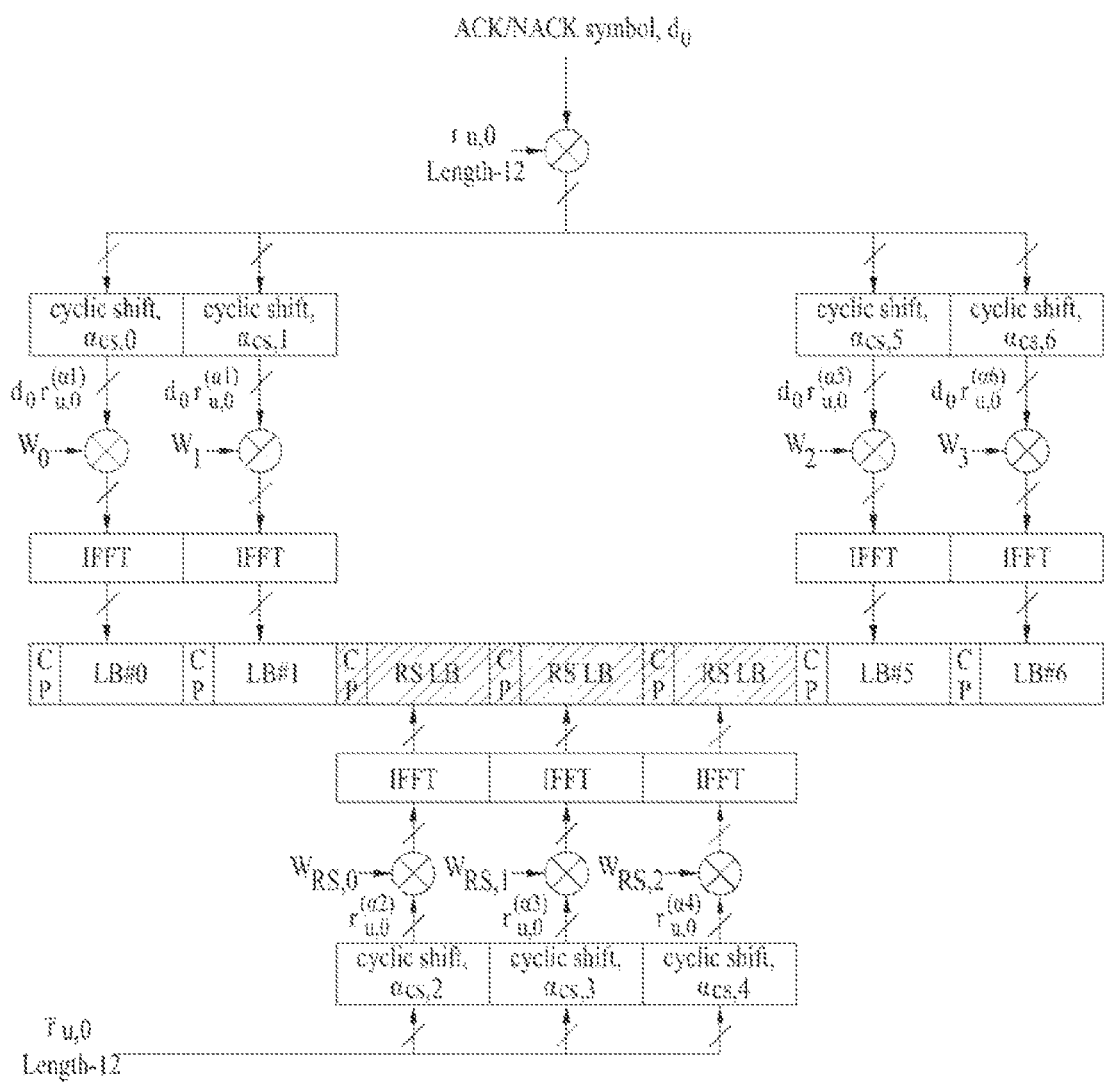
FIG. 5 illustrates a slot level structure of PUCCH format 1a/1b.

FIG. 5 illustrates a slot level structure of PUCCH formats 1a/1b. The PUCCH formats 1a/1b are used for ACK/NACK transmission. In the case of normal CP, SC-FDMA symbols #2, #3 and #4 are used for DM RS transmission. In the case of extended CP, SC-FDMA symbols #2 and #3 are used for DM RS transmission. Accordingly, 4 SC-FDMA symbols in a slot are used for ACK/NACK transmission. PUCCH format 1a/1b is called PUCCH format 1 for convenience.

Referring to FIG. 5, 1-bit [b(0)] and 2-bit [b(0)b(1)] ACK/NACK information are modulated according to BPSK and QPSK modulation schemes respectively, to generate one ACK/NACK modulation symbol $d_0$. Each bit [b(i), i=0, 1] of the ACK/NACK information indicates a HARQ response to a corresponding DL transport block, corresponds to 1 in the case of positive ACK and corresponds to 0 in case of negative ACK (NACK). Table 4 shows a modulation table defined for PUCCH formats 1a and 1b in LTE.

TABLE 4

| PUCCH format | b(0), . . . ,b($M_{bit}$−1) | d(0) |
|---|---|---|
| 1a | 0 | 1 |
|  | 1 | −1 |
| 1b | 00 | 1 |
|  | 01 | −j |
|  | 10 | j |
|  | 11 | −1 |

PUCCH formats 1a/1b perform time domain spreading using an orthogonal spreading code (e.g. Walsh-Hadamard or DFT code) $w_0, w_1, w_2, w_3$ in addition to cyclic shift $\alpha_{cs,x}$ in the frequency domain. In the case of PUCCH formats 1a/1b, a larger number of UEs can be multiplexed on the same PUCCH RB because code multiplexing is used in both frequency and time domains.

Figure 6:
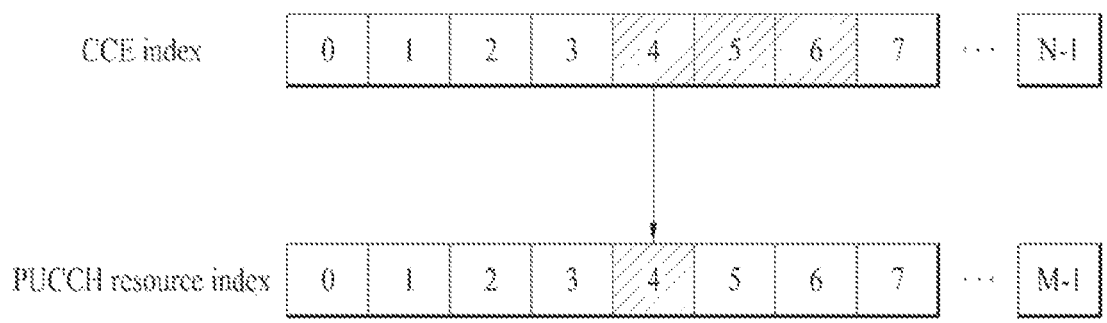
FIG. 6 illustrates an example of determining a PUCCH resource for ACK/NACK.

FIG. 6 illustrates an example of determining PUCCH resources for ACK/NACK. In LTE(-A), a plurality of PUCCH resources for ACK/NACK are shared by a plurality of UEs in a cell every time the UEs need the PUCCH resources rather than allocated to UEs in advance. Specifically, a PUCCH resource used by a UE to transmit an ACK/NACK signal corresponds to a PDCCH on which scheduling information on DL data involving the ACK/NACK signal is delivered or a PDCCH that indicates SPS release. A PDCCH transmitted in a DL subframe to the UE is composed of a plurality of control channel elements (CCEs). The UE can transmit ACK/NACK through a PUCCH resource corresponding to a specific one (e.g. first CCE) of the CCEs constituting the received PDCCH.

Referring to FIG. 6, each block in a Downlink Component Carrier (DL CC) represents a CCE and each block in an Uplink Component Carrier (UL CC) indicates a PUCCH resource. Each PUCCH index corresponds to a PUCCH resource for an ACK/NACK signal. If information on a PDSCH is delivered on a PDCCH composed of CCEs #4, #5 and #6, as shown in FIG. 6, a UE transmits an ACK/NACK signal on PUCCH #4 corresponding to CCE #4, the first CCE of the PDCCH.

Specifically, a PUCCH resource index in LTE(-A) is determined as follows.

$$n^{(1)}_{PUCCH} = n_{CCE} + N^{(1)}_{PUCCH} \quad \text{[Equation 1]}$$

Here, $n^{(1)}_{PUCCH}$ represents a resource index of PUCCH format 1a/1b for ACK/NACK/DTX transmission, $N^{(1)}_{PUCCH}$ denotes a signaling value received from a higher layer, and $n_{CCE}$ denotes the smallest value of CCE indexes used for PDCCH transmission. A cyclic shift, an orthogonal spreading code and a Physical Resource Block (PRB) for PUCCH formats 1a/1b are obtained from $n^{(1)}_{PUCCH}$.

Since an LTE UE cannot simultaneously transmit a PUCCH and a PUSCH, UCI (e.g. CQI/PMI, HARQ-ACK, RI, etc.) is multiplexed to a PUSCH region (PUSCH piggyback) when the UCI needs to be transmitted through a subframe in which a PUSCH is transmitted. An LTE-A UE may also be configured such that the UE cannot simultaneously transmit a PUCCH and a PUSCH. In this case, the UE can multiplex UCI (e.g. CQI/PMI, HARQ-ACK, RI, etc.) to a PUSCH region (PUSCH piggyback) when the UCI needs to be transmitted through a subframe in which a PUSCH is transmitted.

Figure 7:
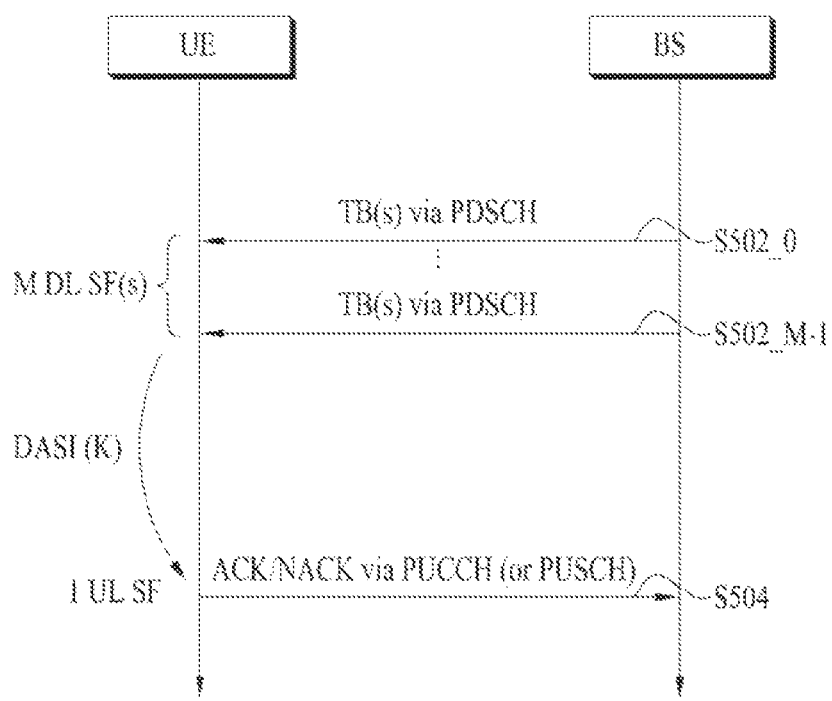
FIG. 7 illustrates a TDD UL ACK/NACK (uplink acknowledgement/negative acknowledgement) transmission process in a single cell situation.

FIG. 7 illustrates a TDD UL ACK/NACK transmission process in a single cell situation.

Referring to FIG. 7, a UE can receive one or more DL signals (e.g. PDSCH signals) in M DL subframes (SFs) (S502_0 to S502_M−1). Each PDSCH signal is used to transmit one or more (e.g. 2) transport blocks (TBs) (or codewords) according to transmission mode. A PDCCH signal requiring an ACK/NACK response, for example, a PDCCH signal indicating SPS (semi-persistent scheduling) release (simply, SPS release PDCCH signal) may also be received in step S502_0 to S502M−1, which is not shown. When a PDSCH signal and/or an SPS release PDCCH signal are present in the M DL subframes, the UE transmits ACK/NACK through a UL subframe corresponding to the M DL subframes via processes for transmitting ACK/NACK (e.g. ACK/NACK (payload) generation, ACK/NACK resource allocation, etc.) (S504). ACK/NACK includes acknowledgement information about the PDSCH signal and/or an SPS release PDCCH received in step S502_0 to S502_M−1. While ACK/NACK is transmitted through a PUCCH basically (refer to FIGS. 5 and 6), ACK/NACK can be transmitted through a PUSCH when a PUSCH is transmitted at ACK/NACK transmission time. Various PUCCH formats shown in Table 3 can be used for ACK/NACK transmission. To reduce the number of transmitted ACK/NACK bits, various methods such as ACK/NACK bundling and ACK/NACK channel selection can be used.

As described above, in TDD, ACK/NACK relating to data received in the M DL subframes is transmitted through one UL subframe (i.e. M DL SF(s): 1 UL SF) and the relationship therebetween is determined by a DASI (Downlink Association Set Index).

Table 5 shows DASI (K: {k0, k1, . . . . . , $k_{M-1}$}) defined in LTE(-A). Table 5 shows spacing between a UL subframe transmitting ACK/NACK and a DL subframe relating to the UL subframe. Specifically, when a PDCCH that indicates PDSCH transmission and/or (downlink) SPS release is present in a subframe n–k (k∈K), the UE transmits ACK/NACK in a subframe n.

TABLE 5

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In TDD operation, the UE needs to transmit an ACK/NACK signal for one or more DL signals (e.g. PDSCH) received through m DL SFs through one UL SF. Transmission of ACKs/NACKs for a plurality of DL SFs through one UL SF is performed according to the following methods.

1) ACK/NACK bundling: ACK/NACK bits for a plurality of data units (e.g. PDSCH, SPS release PDCCH, etc.) are combined according to a logical operation (e.g. logical AND operation). For example, upon successful decoding of all data units, a receiver (e.g. UE) transmits ACK signals. If any of data units has not been decoded (detected), the receiver does not transmit a NACK signal or no signal.

2) Channel selection: Upon reception of a plurality of data units (e.g. PDSCH, SPS release PDCCH, etc.), a UE occupies a plurality of PUCCH resources for ACK/NACK transmission. ACK/NACK responses to the plurality of data units are discriminated according to combinations of PUCCH resources used for ACK/NACK transmission and transmitted ACK/NACK information (e.g. bit values, QPSK symbol values). Channel selection is also called ACK/NACK selection and PUCCH selection.

Channel selection will now be described in more detail. According to channel selection, the UE occupies a plurality of uplink physical channel resources (e.g. PUCCH resources) in order to transmit multiplexed ACK/NACK signals when a plurality of downlink data is received. For example, upon reception of a plurality of PDSCHs, the UE can occupy as many PUCCH resources as the number of PDSCHs using a specific CCE of a PDCCH that indicates each PDSCH. In this case, the UE can transmit ACK/NACK signals multiplexed using a combination of information about a PUCCH selected from the occupied PUCCH resources and information about a modulation/coding scheme applied to the selected PUCCH resource.

Table 6 shows a mapping table for channel selection, defined in LTE.

TABLE 6

| HARQ-ACK(0), HARQ-ACK(1), HARQ-ACK(2), HARQ-ACK(3) | Subframe $n^{(1)}_{PUCCH,i}$ | b(0), b(1) |
|---|---|---|
| ACK, ACK, ACK, ACK | $n^{(1)}_{PUCCH,1}$ | 1, 1 |
| ACK, ACK, ACK, NACK/DTX | $n^{(1)}_{PUCCH,1}$ | 1, 0 |

TABLE 6-continued

| HARQ-ACK(0), HARQ-ACK(1), HARQ-ACK(2), HARQ-ACK(3) | Subframe $n^{(1)}_{PUCCH,i}$ | b(0), b(1) |
|---|---|---|
| NACK/DTX, NACK/DTX, NACK, DTX | $n^{(1)}_{PUCCH,2}$ | 1, 1 |
| ACK, ACK, NACK/DTX, ACK | $n^{(1)}_{PUCCH,1}$ | 1, 0 |

TABLE 6-continued

| HARQ-ACK(0), HARQ-ACK(1), HARQ-ACK(2), HARQ-ACK(3) | Subframe $n^{(1)}_{PUCCH,i}$ | b(0), b(1) |
|---|---|---|
| NACK, DTX, DTX, DTX | $n^{(1)}_{PUCCH,0}$ | 1, 0 |
| ACK, ACK, NACK/DTX, NACK/DTX | $n^{(1)}_{PUCCH,1}$ | 1, 0 |
| ACK, NACK/DTX, ACK, ACK | $n^{(1)}_{PUCCH,3}$ | 0, 1 |
| NACK/DTX, NACK/DTX, NACK/DTX, NACK | $n^{(1)}_{PUCCH,3}$ | 1, 1 |
| ACK, NACK/DTX, ACK, NACK/DTX | $n^{(1)}_{PUCCH,2}$ | 0, 1 |
| ACK, NACK/DTX, NACK/DTX, ACK | $n^{(1)}_{PUCCH,0}$ | 0, 1 |
| ACK, NACK/DTX, NACK/DTX, NACK/DTX | $n^{(1)}_{PUCCH,0}$ | 1, 1 |
| NACK/DTX, ACK, ACK, ACK | $n^{(1)}_{PUCCH,3}$ | 0, 1 |
| NACK/DTX, NACK, DTX, DTX | $n^{(1)}_{PUCCH,1}$ | 0, 0 |
| NACK/DTX, ACK, ACK, NACK/DTX | $n^{(1)}_{PUCCH,2}$ | 1, 0 |
| NACK/DTX, ACK, NACK/DTX, ACK | $n^{(1)}_{PUCCH,3}$ | 1, 0 |
| NACK/DTX, ACK, NACK/DTX, NACK/DTX | $n^{(1)}_{PUCCH,1}$ | 0, 1 |
| NACK/DTX, NACK/DTX, ACK, ACK | $n^{(1)}_{PUCCH,3}$ | 0, 1 |
| NACK/DTX, NACK/DTX, ACK, NACK/DTX | $n^{(1)}_{PUCCH,2}$ | 0, 0 |
| NACK/DTX, NACK/DTX, NACK/DTX, ACK | $n^{(1)}_{PUCCH,3}$ | 0, 0 |
| DTX, DTX, DTX, DTX | N/A | N/A |

In Table 6, HARQ-ACK(i) indicates a HARQ ACK/NACK/DTX response of an i-th data unit (0≤i≤3). The HARQ ACK/NACK/DTX response includes ACK, NACK, DTX and NACK/DTX. NACK/DTX represents NACK or DTX. ACK and NACK represent whether a TB (equivalent to a CW) transmitted through a PDSCH has been successfully decoded or not. DTX (Discontinuous Transmission) represents that a PDCCH has not been successfully detected. Maximum 4 PUCCH resources (i.e., $n^{(1)}_{PUCCH,0}$ to $n^{(1)}_{PUCCH,3}$) can be occupied for each data unit. The multiplexed ACK/NACK signal is transmitted through one PUCCH resource selected from the occupied PUCCH resources. In Table 6, $n^{(1)}_{PUCCH,i}$ represents a PUCCH resource actually used for ACK/NACK transmission, and b(0)b(1) indicates two bits transmitted through the selected PUCCH resource, which are modulated using QPSK. For example, when the UE has decoded 4 data units successfully, the UE transmits bits (1, 1) to a BS through a PUCCH resource linked with $n^{(1)}_{PUCCH,1}$. Since combinations of PUCCH resources and QPSK symbols cannot represent all available ACK/NACK suppositions, NACK and DTX are coupled except in some cases (NACK/DTX, N/D).

Figure 8:
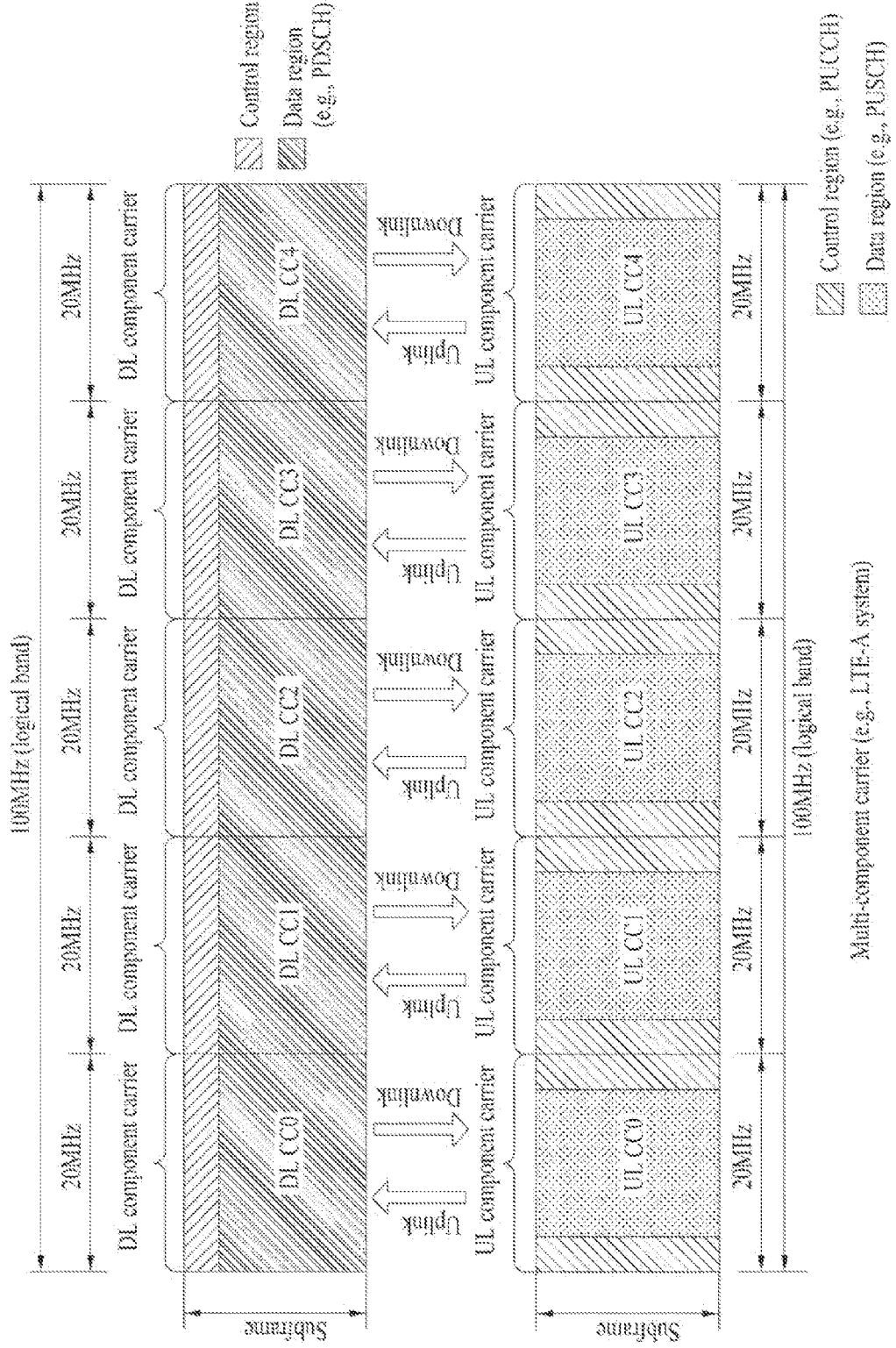
FIG. 8 illustrates a carrier aggregation (CA) communication system.

FIG. 8 illustrates a carrier aggregation (CA) communication system. To use a wider frequency band, an LTE-A system employs CA (or bandwidth aggregation) technology which aggregates a plurality of UL/DL frequency blocks to obtain a wider UL/DL bandwidth. Each frequency block is transmitted using a component carrier (CC). The CC can be regarded as a carrier frequency (or center carrier, center frequency) for the frequency block.

Referring to FIG. 8, a plurality of UL/DL CCs can be aggregated to support a wider UL/DL bandwidth. The CCs may be contiguous or non-contiguous in the frequency domain. Bandwidths of the CCs can be independently determined Asymmetrical CA in which the number of UL CCs is different from the number of DL CCs can be implemented. For example, when there are two DL CCs and one UL CC, the DL CCs can correspond to the UL CC in the ratio of 2:1. A DL CC/UL CC link can be fixed or semi-statically configured in the system. Even if the system bandwidth is configured with N CCs, a frequency band that a specific UE can monitor/receive can be limited to L (<N) CCs. Various parameters with respect to CA can be set cell-specifically, UE-group-specifically, or UE-specifically. Control information may be transmitted/received only through a specific CC. This specific CC can be referred to as a Primary CC (PCC) (or anchor CC) and other CCs can be referred to as Secondary CCs (SCCs).

In LTE-A, the concept of a cell is used to manage radio resources [refer to 36.300 V10.2.0 (2010-12) 5.5. Carrier Aggregation; 7.5. Carrier Aggregation]. A cell is defined as a combination of downlink resources and uplink resources. Yet, the uplink resources are not mandatory. Therefore, a cell may be composed of downlink resources only or both downlink resources and uplink resources. The linkage between the carrier frequencies (or DL CCs) of downlink resources and the carrier frequencies (or UL CCs) of uplink resources may be indicated by system information. A cell operating in primary frequency resources (or a PCC) may be referred to as a primary cell (PCell) and a cell operating in secondary frequency resources (or an SCC) may be referred to as a secondary cell (SCell). The PCell is used for a UE to establish an initial connection or re-establish a connection. The PCell may refer to a cell indicated during handover. The SCell may be configured after an RRC connection is established and may be used to provide additional radio resources. The PCell and the SCell may collectively be referred to as a serving cell. Accordingly, a single serving cell composed of a PCell only exists for a UE in an RRC_Connected state, for which CA is not set or which does not support CA. On the other hand, one or more serving cells exist, including a PCell and entire SCells, for a UE in an RRC_CONNECTED state, for which CA is set. For CA, a network may configure one or more SCells in addition to an initially configured PCell, for a UE supporting CA during connection setup after an initial security activation operation is initiated.

When cross-carrier scheduling (or cross-CC scheduling) is applied, a PDCCH for downlink allocation can be transmitted on DL CC #0 and a PDSCH corresponding thereto can be transmitted on DL CC #2. For cross-CC scheduling, introduction of a carrier indicator field (CIF) can be considered. Presence or absence of the CIF in a PDCCH can be determined by higher layer signaling (e.g. RRC signaling) semi-statically and UE-specifically (or UE group-specifically). The baseline of PDCCH transmission is summarized as follows.

CIF disabled: a PDCCH on a DL CC is used to allocate a PDSCH resource on the same DL CC or a PUSCH resource on a linked UL CC.

CIF enabled: a PDCCH on a DL CC can be used to allocate a PDSCH or PUSCH resource on a specific DL/UL CC from among a plurality of aggregated DL/UL CCs using the CIF.

When the CIF is present, the BS can allocate a PDCCH monitoring DL CC to reduce BD complexity of the UE. The PDCCH monitoring DL CC set includes one or more DL CCs as parts of aggregated DL CCs and the UE detects/decodes a PDCCH only on the corresponding DL CCs. That is, when the BS schedules a PDSCH/PUSCH for the UE, a PDCCH is transmitted only through the PDCCH monitoring DL CC set. The PDCCH monitoring DL CC set can be set in a UE-specific, UE-group-specific or cell-specific manner. The term "PDCCH monitoring DL CC" can be replaced by the terms such as "monitoring carrier" and "monitoring cell". The term "CC" aggregated for the UE can be replaced by the terms such as "serving CC", "serving carrier" and "serving cell".

Figure 9:
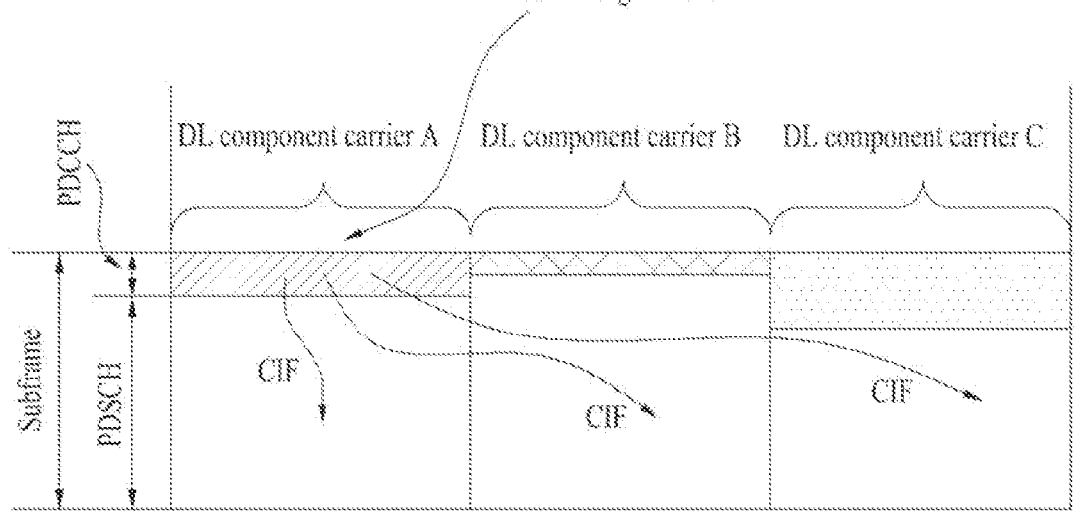
FIG. 9 illustrates scheduling in case of aggregation of a plurality of carriers.

FIG. 9 illustrates scheduling when a plurality of carriers is aggregated. It is assumed that 3 DL CCs are aggregated and DL CC A is set to a PDCCH CC. DL CC A, DL CC B and DL CC C can be called serving CCs, serving carriers, serving cells, etc. In case of CIF (Carrier Indicator Field) disabled, a DL CC can transmit only a PDCCH that schedules a PDSCH corresponding to the DL CC without a CIF (non-cross-CC scheduling). When the CIF is enabled according to UE-specific (or UE-group-specific or cell-specific) higher layer signaling, a specific CC (e.g. DL CC A) can transmit not only a PDCCH that schedules the PDSCH corresponding to the DL CC A but also PDCCHs that schedule PDSCHs of other DL CCs using the CIF (cross-CC scheduling). A PDCCH is not transmitted in DL CC B/C.

A description will be given of a case in which channel selection using PUCCH format 1b is set for HARQ-ACK transmission in case of TDD CA. It is assumed that 2 serving cells (i.e. PCell and SCell or PCC and SCC) having the same TDD UL-DL configuration are aggregated in LTE-A.

A channel selection scheme using PUCCH format 1b when $M \leq 2$ in a UL subframe n for HARQ-ACK transmission will first be described. Here, M denotes the number of (i.e. the number of DL SFs corresponding to UL SFs) of elements of set K described above with reference to Table 5. When $M \leq 2$ in the UL subframe n, a UE can transmit b(0)b(1) on a PUCCH resource selected from A PUCCH resources $n^{(1)}_{PUCCH,i}$ ($0 \leq i \leq A-1$ and $A \subset \{2,3,4\}$). Specifically, the UE transmits an A/N signal in the UL subframe n using PUCCH format 1b according to Table 7, 8 and 9. When M=1 in the UL subframe n, HARQ-ACK(j) denotes an A/N response to a TB or an SPS release PDCCH, which is related to a serving cell c. Here, when M=1, a TB, HARQ-ACK(j) and A PUCCH resources can be given according to Table 10. When M=2 in the UL subframe n, HARQ-ACK(j) denotes an A/N response to a TB or an SPS release PDCCH in DL subframe(s) provided by set K in each serving cell. Here, M=2, subframes and A PUCCH resources in each serving cell for HARQ-ACK(j) can be given according to Table 11.

Table 7 is a mapping table for channel selection, defined in LTE-A when 2 CCs having the same UL-DL configuration are aggregated, M=1 and A=2.

TABLE 7

| HARQ-ACK(0), HARQ-ACK(1) | $n_{PUCCH}^{(1)}$ | b(0)b(1) |
|---|---|---|
| ACK, ACK | $n_{PUCCH,1}^{(1)}$ | 1, 0 |
| ACK, NACK/DTX | $n_{PUCCH,0}^{(1)}$ | 1, 1 |
| NACK/DTX, ACK | $n_{PUCCH,1}^{(1)}$ | 0, 1 |
| NACK, NACK/DTX | $n_{PUCCH,0}^{(1)}$ | 0, 0 |
| DTX, NACK/DTX | | No Transmission |

Here, an implicit PUCCH resource linked to a PDCCH (i.e. PCC-PDCCH) that schedules a PCC (or PCell) can be allocated to $n^{(1)}_{PUCCH,0}$ and an implicit PUCCH resource linked to a PDCCH (i.e. SCC-PDCCH) that schedules an SCC or an explicit PUCCH resource reserved by RRC can be allocated to $n^{(1)}_{PUCCH,1}$ according to whether cross-CC scheduling is applied. For example, when cross-CC scheduling is applied, an implicit PUCCH resource linked to the PCC-PDCCH and an implicit PUCCH resource linked to the SCC-PDCCH can be respectively allocated to $n^{(1)}_{PUCCH,0}$ and $n^{(1)}_{PUCCH,1}$.

Table 8 is a mapping table for channel selection, defined in LTE-A when 2 CCs having the same UL-DL configuration are aggregated, M=1 and A=3.

TABLE 8

| HARQ-ACK(0), HARQ-ACK(1), HARQ-ACK(2) | $n_{PUCCH}^{(1)}$ | b(0)b(1) |
|---|---|---|
| ACK, ACK, ACK | $n_{PUCCH,2}^{(1)}$ | 1, 1 |
| ACK, ACK, NACK/DTX | $n_{PUCCH,1}^{(1)}$ | 1, 0 |
| ACK, NACK/DTX, ACK | $n_{PUCCH,2}^{(1)}$ | 1, 0 |
| ACK, NACK/DTX, NACK/DTX | $n_{PUCCH,0}^{(1)}$ | 1, 1 |
| NACK/DTX, ACK, ACK | $n_{PUCCH,2}^{(1)}$ | 0, 1 |
| NACK/DTX, ACK, NACK/DTX | $n_{PUCCH,1}^{(1)}$ | 0, 1 |
| NACK/DTX, NACK/DTX, ACK | $n_{PUCCH,2}^{(1)}$ | 0, 0 |
| NACK, NACK/DTX, NACK/DTX | $n_{PUCCH,0}^{(1)}$ | 0, 0 |
| DTX, NACK/DTX, NACK/DTX | No Transmission | |

Here, when the PCC is a MIMO CC and the SCC is a non-MIMO CC, an implicit PUCCH resource linked to the PCC-PDCCH can be allocated to $n^{(1)}_{PUCCH,0}$ and $n^{(1)}_{PUCCH,1}$, and an implicit PUCCH resource linked to the SCC-PDCCH or an explicit PUCCH resource reserved by RRC can be allocated to $n^{(1)}_{PUCCH,2}$ according to whether cross-CC scheduling is applied. If the PCC is a non-MIMO CC and the SCC is a MIMO CC, an implicit PUCCH resource linked to the PCC-PDCCH can be allocated to $n^{(1)}_{PUCCH,0}$, and an implicit PUCCH resource linked to the SCC-PDCCH or an explicit PUCCH resource reserved by RRC can be allocated to $n^{(1)}_{PUCCH,1}$ and $n^{(1)}_{PUCCH,2}$ according to whether cross-CC scheduling is applied.

Table 9 is a mapping table for channel selection, defined in LTE-A when 2 CCs having the same UL-DL configuration are aggregated, M≤2 and A=4.

TABLE 9

| HARQ-ACK(0), HARQ-ACK(1), HARQ-ACK(2), HARQ-ACK(3) | $n_{PUCCH}^{(1)}$ | b(0)b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,2}^{(1)}$ | 1, 1 |
| ACK, ACK, NACK/DTX, ACK | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 1, 1 |
| ACK, NACK/DTX, ACK, NACK/DTX | $n_{PUCCH,2}^{(1)}$ | 1, 0 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,1}^{(1)}$ | 0, 0 |
| NACK/DTX, ACK, ACK, NACK/DTX | $n_{PUCCH,2}^{(1)}$ | 0, 1 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| NACK, NACK/DTX, NACK/DTX, NACK/DTX | $n_{PUCCH,0}^{(1)}$ | 0, 0 |
| DTX, NACK/DTX, NACK/DTX, NACK/DTX | No Transmission | |

Here, an implicit PUCCH resource linked to the PDCCH (i.e. PCC-PDCCH) that schedules the PCC (or PCell) can be allocated to $n^{(1)}_{PUCCH,0}$ and $n^{(1)}_{PUCCH,1}$ irrespective of whether cross-CC scheduling is applied, and an implicit PUCCH resource linked to the PDCCH (i.e. SCC-PDCCH) that schedules the SCC or an explicit PUCCH resource reserved by RRC can be allocated to $n^{(1)}_{PUCCH,2}$ and $n^{(1)}_{PUCCH,3}$ according to whether cross-CC scheduling is applied. For example, when cross-CC scheduling is applied and M=2, implicit PUCCH resources linked to PCC-PDCCHs corresponding to first and second DL SFs can be allocated to $n^{(1)}_{PUCCH,0}$ and $n^{(1)}_{PUCCH,1}$ and implicit PUCCH resources linked to SCC-PDCCHs corresponding to the first and second DL SFs can be allocated to $n^{(1)}_{PUCCH,2}$ and $n^{(1)}_{PUCCH,3}$.

Table 10 shows TBs, HARQ-ACK(j) and PUCCH resources when M=1.

TABLE 10

| | | HARQ-ACK(j) | | |
|---|---|---|---|---|
| A | HARQ-ACK(0) | HARQ-ACK(1) | HARQ-ACK(2) | HARQ-ACK(3) |
| 2 | TB1 Primary cell | TB1 Secondary cell | NA | NA |
| 3 | TB1 Primary cell | TB1 Secondary cell | TB2 Secondary cell | NA |
| 3 | TB1 Primary cell | TB2 Primary cell | TB1 Secondary cell | NA |
| 4 | TB1 Primary cell | TB2 Primary cell | TB1 Secondary cell | TB2 Secondary cell |

* TB: transport block, NA: not available

Table 11 shows TBs, HARQ-ACK(j) and PUCCH resources when M=2.

TABLE 11

| | | HARQ-ACK(j) | | |
|---|---|---|---|---|
| A | HARQ-ACK(0) | HARQ-ACK(1) | HARQ-ACK(2) | HARQ-ACK(3) |
| 4 | The first subframe of Primary cell | The second subframe of Primary cell | The first subframe of Secondary cell | The second subframe of Secondary cell |

A channel selection scheme using PUCCH format 1b when M>2 in the UL subframe n for HARQ-ACK transmission will now be described first. This channel selection scheme is similar to the channel selection scheme in case of M≤2. Specifically, the UE transmits an A/N signal using PUCCH format 1b in the UL subframe n according to Tables 12 and 13. When M>2 in the UL subframe n, $n^{(1)}_{PUCCH,0}$ and $n^{(1)}_{PUCCH,1}$ are related to DL transmission (e.g. PDSCH transmission) on the PCell and $n^{(1)}_{PUCCH,2}$ and $n^{(1)}_{PUCCH,3}$ are related to DL transmission (e.g. PDSCH transmission) on the SCell.

HARQ-ACK(i) for an arbitrary cell denotes an A/N response to a PDCCH (PDSCH corresponding thereto) on which DAI-c that schedules the cell is i+1. When a PDSCH w/o PDCCH is present, HARQ-ACK(0) may refer to an A/N response to the PDSCH w/o PDCCH and HARQ-ACK(1) may refer to an A/N response to a PDCCH (PDSCH corresponding thereto) on which DAI-c is i.

Table 12 is a mapping table for channel selection, defined in LTE-A when 2 CCs having the same UL-DL configuration are aggregated and M=3.

TABLE 12

| Primary Cell | Secondary Cell | Resource | Constellation b(0), b(1) | RM Code Input Bits 0(0), 0(1), 0(2), 0(3) |
|---|---|---|---|---|
| HARQ-ACK(0), HARQ-ACK(1), HARQ-ACK(2) | HARQ-ACK(0), HARQ-ACK(1), HARQ-ACK(2) | $n_{PUCCH}^{(1)}$ | b(0), b(1) | 0(0), 0(1), 0(2), 0(3) |
| ACK, ACK, ACK | ACK, ACK, ACK | $n_{PUCCH,1}^{(1)}$ | 1, 1 | 1, 1, 1, 1 |
| ACK, ACK, NACK/DTX | ACK, ACK, ACK | $n_{PUCCH,1}^{(1)}$ | 0, 0 | 1, 0, 1, 1 |
| ACK, NACK/DTX, any | ACK, ACK, ACK | $n_{PUCCH,3}^{(1)}$ | 1, 1 | 0, 1, 1, 1 |
| NACK/DTX, any, any | ACK, ACK, ACK | $n_{PUCCH,3}^{(1)}$ | 0, 1 | 0, 0, 1, 1 |
| ACK, ACK, ACK | ACK, ACK, NACK/DTX | $n_{PUCCH,0}^{(1)}$ | 1, 0 | 1, 1, 1, 0 |
| ACK, ACK, NACK/DTX | ACK, ACK, NACK/DTX | $n_{PUCCH,3}^{(1)}$ | 1, 0 | 1, 0, 1, 0 |
| ACK, NACK/DTX, any | ACK, ACK, NACK/DTX | $n_{PUCCH,0}^{(1)}$ | 0, 1 | 0, 1, 1, 0 |
| NACK/DTX, any, any | ACK, ACK, NACK/DTX | $n_{PUCCH,3}^{(1)}$ | 0, 0 | 0, 0, 1, 0 |
| ACK, ACK, ACK | ACK, NACK/DTX, any | $n_{PUCCH,2}^{(1)}$ | 1, 1 | 1, 1, 0, 1 |
| ACK, ACK, NACK/DTX | ACK, NACK/DTX, any | $n_{PUCCH,2}^{(1)}$ | 0, 1 | 1, 0, 0, 1 |
| ACK, NACK/DTX, any | ACK, NACK/DTX, any | $n_{PUCCH,2}^{(1)}$ | 1, 0 | 0, 1, 0, 1 |
| NACK/DTX, any, any | ACK, NACK/DTX, any | $n_{PUCCH,2}^{(1)}$ | 0, 0 | 0, 0, 0, 1 |
| ACK, ACK, ACK | NACK/DTX, any, any | $n_{PUCCH,1}^{(1)}$ | 1, 0 | 1, 1, 0, 0 |
| ACK, ACK, NACK/DTX | NACK/DTX, any, any | $n_{PUCCH,1}^{(1)}$ | 0, 1 | 1, 0, 0, 0 |
| ACK, NACK/DTX, any | NACK/DTX, any, any | $n_{PUCCH,0}^{(1)}$ | 1, 1 | 0, 1, 0, 0 |
| NACK, any, any | NACK/DTX, any, any | $n_{PUCCH,0}^{(1)}$ | 0, 0 | 0, 0, 0, 0 |
| DTX, any, any | NACK/DTX, any, any | No Transmission | | 0, 0, 0, 0 |

Here, an implicit PUCCH resource linked to the PDCCH (i.e. PCC-PDCCH) that schedules the PCC (or PCell) can be allocated to $n^{(1)}_{PUCCH,0}$ and/or $n^{(1)}_{PUCCH,1}$ irrespective of whether cross-CC scheduling is applied, and an implicit PUCCH resource linked to the PDCCH (i.e. SCC-PDCCH) that schedules the SCC or an explicit PUCCH resource reserved by RRC can be allocated to $n^{(1)}_{PUCCH,2}$ and/or $n^{(1)}_{PUCCH,3}$ according to whether cross-CC scheduling is applied. For example, implicit PUCCH resources linked to PCC-PDCCHs respectively corresponding to DAI-c of 1 and DAI-c of 2 can be respectively allocated to $n^{(1)}_{PUCCH,0}$ and $n^{(1)}_{PUCCH,1}$ and implicit PUCCH resources linked to SCC-PDCCHs respectively corresponding to DAI-c of 1 and DAI-c of 2 can be respectively allocated to $n^{(1)}_{PUCCH,2}$ and $n^{(1)}_{PUCCH,3}$ in a TDD situation.

Table 13 is a mapping table for channel selection, defined in LTE-A when 2 CCs having the same UL-DL configuration are aggregated and M=4.

TABLE 13

| Primary Cell | Secondary Cell | Resource | Constellation b(0), b(1) | RM Code Input Bits 0(0), 0(1), 0(2), 0(3) |
|---|---|---|---|---|
| HARQ-ACK(0), HARQ-ACK(1), HARQ-ACK(2), HARQ-ACK(3) | HARQ-ACK(0), HARQ-ACK(1), HARQ-ACK(2), HARQ-ACK(3) | $n_{PUCCH}^{(1)}$ | b(0), b(1) | 0(0), 0(1), 0(2), 0(3) |
| ACK, ACK, ACK, NACK/DTX | ACK, ACK, ACK, NACK/DTX | $n_{PUCCH,1}^{(1)}$ | 1, 1 | 1, 1, 1, 1 |
| ACK, ACK, NACK/DTX, any | ACK, ACK, ACK, NACK/DTX | $n_{PUCCH,1}^{(1)}$ | 0, 0 | 1, 0, 1, 1 |
| ACK, DTX, DTX, DTX | ACK, ACK, ACK, NACK/DTX | $n_{PUCCH,3}^{(1)}$ | 1, 1 | 0, 1, 1, 1 |
| ACK, ACK, ACK, ACK | ACK, ACK, ACK, NACK/DTX | $n_{PUCCH,3}^{(1)}$ | 1, 1 | 0, 1, 1, 1 |
| NACK/DTX, any, any, any | ACK, ACK, ACK, NACK/DTX | $n_{PUCCH,3}^{(1)}$ | 0, 1 | 0, 0, 1, 1 |
| (ACK, NACK/DTX, any, any), except for (ACK, DTX, DTX, DTX) | ACK, ACK, ACK, NACK/DTX | $n_{PUCCH,3}^{(1)}$ | 0, 1 | 0, 0, 1, 1 |
| ACK, ACK, ACK, NACK/DTX | ACK, ACK, NACK/DTX, any | $n_{PUCCH,0}^{(1)}$ | 1, 0 | 1, 1, 1, 0 |
| ACK, ACK, | ACK, ACK, | $n_{PUCCH,3}^{(1)}$ | 1, 0 | 1, 0, 1, 0 |

TABLE 13-continued

| Primary Cell | Secondary Cell | Resource | Constellation | RM Code Input Bits |
|---|---|---|---|---|
| NACK/DTX, any ACK, DTX, DTX, DTX | NACK/DTX, any ACK, ACK, NACK/DTX, any | $n_{PUCCH,0}^{(1)}$ | 0, 1 | 0, 1, 1, 0 |
| ACK, ACK, ACK, ACK | ACK, ACK, NACK/DTX, any | $n_{PUCCH,0}^{(1)}$ | 0, 1 | 0, 1, 1, 0 |
| NACK/DTX, any, any, any | ACK, ACK, NACK/DTX, any | $n_{PUCCH,3}^{(1)}$ | 0, 0 | 0, 0, 1, 0 |
| (ACK, NACK/DTX, any, any), except for (ACK, DTX, DTX, DTX) | ACK, ACK, NACK/DTX, any | $n_{PUCCH,3}^{(1)}$ | 0, 0 | 0, 0, 1, 0 |
| ACK, ACK, ACK, NACK/DTX | ACK, DTX, DTX, DTX | $n_{PUCCH,2}^{(1)}$ | 1, 1 | 1, 1, 0, 1 |
| ACK, ACK, ACK, NACK/DTX | ACK, ACK, ACK, ACK | $n_{PUCCH,2}^{(1)}$ | 1, 1 | 1, 1, 0, 1 |
| ACK, ACK, NACK/DTX, any | ACK, DTX, DTX, DTX | $n_{PUCCH,2}^{(1)}$ | 0, 1 | 1, 0, 0, 1 |
| ACK, ACK, NACK/DTX, any | ACK, ACK, ACK, ACK | $n_{PUCCH,2}^{(1)}$ | 0, 1 | 1, 0, 0, 1 |
| ACK, DTX, DTX, DTX | ACK, DTX, DTX, DTX | $n_{PUCCH,2}^{(1)}$ | 1, 0 | 0, 1, 0, 1 |
| ACK, DTX, DTX, DTX | ACK, ACK, ACK, ACK | $n_{PUCCH,2}^{(1)}$ | 1, 0 | 0, 1, 0, 1 |
| ACK, ACK, ACK, ACK | ACK, DTX, DTX, DTX | $n_{PUCCH,2}^{(1)}$ | 1, 0 | 0, 1, 0, 1 |
| ACK, ACK, ACK, ACK | ACK, ACK, ACK, ACK | $n_{PUCCH,2}^{(1)}$ | 1, 0 | 0, 1, 0, 1 |
| NACK/DTX, any, any, any | ACK, DTX, DTX, DTX | $n_{PUCCH,2}^{(1)}$ | 0, 0 | 0, 0, 0, 1 |
| NACK/DTX, any, any, any | ACK, ACK, ACK, ACK | $n_{PUCCH,2}^{(1)}$ | 0, 0 | 0, 0, 0, 1 |
| (ACK, NACK/DTX, any, any) except for (ACK, DTX, DTX, DTX) | ACK, DTX, DTX, DTX | $n_{PUCCH,2}^{(1)}$ | 0, 0 | 0, 0, 0, 1 |
| (ACK, NACK/DTX, any, any), except for (ACK, DTX, DTX, DTX) | ACK, ACK, ACK, ACK | $n_{PUCCH,2}^{(1)}$ | 0, 0 | 0, 0, 0, 1 |
| ACK, ACK, ACK, NACK/DTX | NACK/DTX, any, any, any | $n_{PUCCH,1}^{(1)}$ | 1, 0 | 1, 1, 0, 0 |
| ACK, ACK, ACK, NACK/DTX | (ACK, NACK/DTX, any, any), except for (ACK, DTX, DTX, DTX) | $n_{PUCCH,1}^{(1)}$ | 1, 0 | 1, 1, 0, 0 |
| ACK, ACK, NACK/DTX, any | NACK/DTX, any, any, any | $n_{PUCCH,1}^{(1)}$ | 0, 1 | 1, 0, 0, 0 |
| ACK, ACK, NACK/DTX, any | (ACK, NACK/DTX, any, any), except for (ACK, DTX, DTX, DTX) | $n_{PUCCH,1}^{(1)}$ | 0, 1 | 1, 0, 0, 0 |
| ACK, DTX, DTX, DTX | NACK/DTX, any, any, any | $n_{PUCCH,0}^{(1)}$ | 1, 1 | 0, 1, 0, 0 |
| ACK, DTX, DTX, DTX | (ACK, NACK/DTX, any, any), except for (ACK, DTX, DTX, DTX) | $n_{PUCCH,0}^{(1)}$ | 1, 1 | 0, 1, 0, 0 |
| ACK, ACK, ACK, ACK | NACK/DTX, any, any, any | $n_{PUCCH,0}^{(1)}$ | 1, 1 | 0, 1, 0, 0 |
| ACK, ACK, ACK, ACK | (ACK, NACK/DTX, any, any), except for (ACK, DTX, DTX, DTX) | $n_{PUCCH,0}^{(1)}$ | 1, 1 | 0, 1, 0, 0 |
| NACK, any, any, any | NACK/DTX, any, any, any | $n_{PUCCH,0}^{(1)}$ | 0, 0 | 0, 0, 0, 0 |
| NACK, any, any, any | (ACK, NACK/DTX, any, any), except for (ACK, DTX, DTX, DTX) | $n_{PUCCH,0}^{(1)}$ | 0, 0 | 0, 0, 0, 0 |
| (ACK, NACK/DTX, any, any), except for (ACK, DTX, DTX, DTX) | NACK/DTX, any, any, any | $n_{PUCCH,0}^{(1)}$ | 0, 0 | 0, 0, 0, 0 |
| (ACK, NACK/DTX, any, any), except for (ACK, DTX, DTX, DTX) | (ACK, NACK/DTX, any, any), except for (ACK, DTX, DTX, DTX) | $n_{PUCCH,0}^{(1)}$ | 0, 0 | 0, 0, 0, 0 |

TABLE 13-continued

| Primary Cell | Secondary Cell | Resource | Constellation | RM Code Input Bits |
|---|---|---|---|---|
| DTX, any, any, any | NACK/DTX, any, any, any | | No Transmission | 0, 0, 0, 0 |
| DTX, any, any, any | (ACK, NACK/DTX, any, any), except for (ACK, DTX, DTX, DTX) | | No Transmission | 0, 0, 0, 0 |

Here, $n^{(1)}_{PUCCH,0}$, $n^{(1)}_{PUCCH,1}$, $n^{(1)}_{PUCCH,2}$ and $n^{(1)}_{PUCCH,3}$ can be allocated as shown in Table 12.

Figure 10:
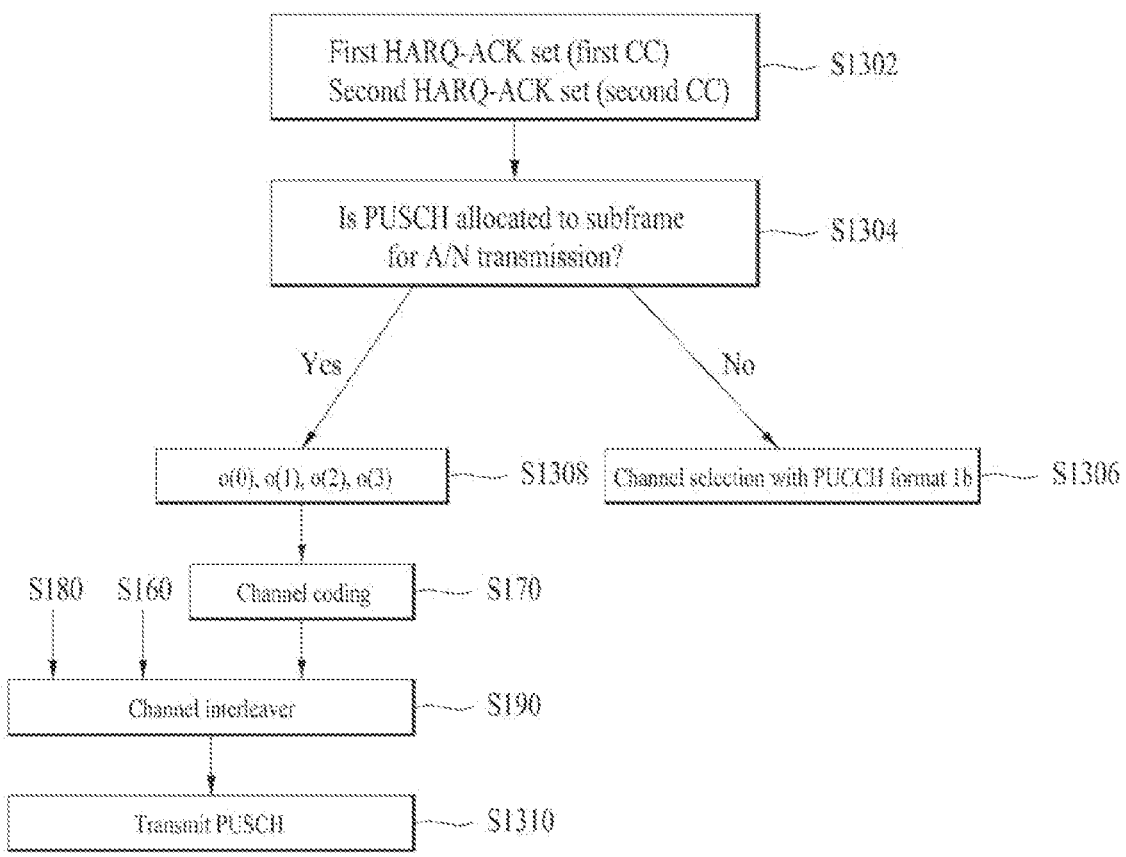
FIG. 10 illustrates a TDD CA A/N transmission process.

FIG. 10 illustrates an A/N transmission process in TDD CA. The A/N transmission process is based on the assumption that 2 CCs (e.g. PCC and SCC) having the same UL-DL configuration are aggregated.

Referring to FIG. 10, a UE generates HARQ-ACK of a first set for the first CC (or cell) and HARQ-ACK of a second set for the second CC (or cell) (S1302). Then, the UE checks whether a PUSCH is allocated to a subframe (referred to as A/N subframe hereinafter) for A/N transmission (S1304). When a PUSCH is not allocated to the A/N subframe, the UE transmits A/N information through PUCCH format 1b and channel selection (refer to Tables 7 to 13). When a PUSCH is allocated to the A/N subframe, the UE multiplexes A/N bits to the PUSCH. Specifically, the UE generates an A/N bit sequence (e.g. o(0), o(1), o(2), o(3) in Tables 12 and 13) corresponding to HARQ-ACK of the first set and HARQ-ACK of the second set (S1308). The A/N bit sequence is subjected to channel coding (S170) and channel interleaving (S190) and then transmitted through the PUSCH (S1310). Channel coding includes RM (Reed-Muller) coding, Tail-biting convolutional coding, etc.

Embodiment

A/N Channel Selection for TDD CA

A beyond LTE-A system based on TDD may consider aggregation of a plurality of CCs in different UL-DL configurations. In this case, different A/N timings (i.e. UL SF timing at which A/N with respect to DL data transmitted through each DL SF is transmitted) may be set to a PCC and an SCC according to UL-DL configurations of the corresponding CCs. For example, UL SF timing at which A/N is transmitted for the same DL SF timing (DL data transmitted at the DL SF timing) can be set differently for the PCC and SCC, and a DL SF group for which A/N feedback is transmitted at the same UL SF timing can be set differently for the PCC and the SCC. Furthermore, link directions (i.e. DL or UL) of the PCC and the SCC may be set differently for the same SF timing. For example, the SCC can be set as UL SF at specific SF timing, whereas the PCC can be set as DL SF at the same SF timing.

In addition, the beyond LTE-A system based on TDD may support cross-CC scheduling in CA based on different TDD UL-DL configurations (referred to as different TDD CA for convenience). In this case, different UL grant timings (DL SF timing at which a UL grant that schedules UL transmission is transmitted) and different PHICH timings (DL SF timing at which a PHICH corresponding to UL data is transmitted) may be set to an MCC (monitoring CC) and an SCC. For example, a DL SF in which a UL grant/PHICH is transmitted can be set differently for the same UL SF. Furthermore, a UL SF group for which a UL grant or PHICH feedback is transmitted in the same DL SF can be set differently for the MCC and the SCC.

In this case, link directions of the MCC and the SCC may be set differently for the same SF timing. For example, specific SF timing can be set to a DL SF in which a UL grant/PHICH will be transmitted in case of the SCC, whereas the SF timing can be set to a UL SF in case of the MCC.

When SF timing (referred to as collided SF hereinafter) at which link directions of the PCC and SCC are different from each other due to different TDD CA configuration is present, only a CC from the PCC and SCC, which has a specific link direction or has the same link direction as that of a specific CC (e.g. PCC), can be handled at the SF timing due to hardware configuration of the UE or for other reasons/purposes. This scheme is called HD (Half-Duplex)-TDD CA for convenience. For example, when SF collision occurs because specific SF timing is set to a DL SF in case of PCC and the SF timing is set to a UL SF in case of SF, only a PCC (i.e. DL SF set to the PCC) corresponding to DL is handled and an SCC (i.e. UL SF set to the SCC) corresponding to UL is not handled at the SF timing (and vice versa). In this situation, to transmit A/N feedback for DL data transmitted through DL SFs of all CCs through a PCC, identical or different (set to a specific UL-DL configuration) A/N timings may be applied to CCs, or A/N timing set to a specific UL-DL configuration may be commonly applied to all CCs. Here, the specific UL-DL configuration (referred to as a reference configuration (Ref-Cfg)) commonly applied to all CCs can corresponds to a UL-DL configuration set to a PCC or SCC or can be determined as a UL-DL configuration other than the UL-DL configuration set to the PCC or SCC.

In case of HD-TDD CA, the number of DL SFs (referred to as A/N-DL SFs) for which A/N feedback is transmitted at one UL SF timing may be set differently for the PCC and SCC. In other words, when the number of DL SFs (A/N-DL SFs) corresponding to one UL SF is defined as M, M can be set differently/independently for CCs (M for each CC: Mc) for one PCC UL SF. When Ref-Cfg of a specific XCC (e.g. PCC or SCC) does not correspond to the UL-DL configuration (i.e. PCC-Cfg) of the PCC, an A/N-DL SF index of the XCC, set to PCC UL SF timing, may be different from an A/N-DL SF index when A/N timing of the PCC-Cfg is applied. Particularly, when a PUCCH resource linked to a CCE resource of a PDCCH that schedules DL data is called an implicit PUCCH, an implicit PUCCH may not be defined (in a PCC UL SF in which A/N with respect to an XCC DL SF will be transmitted) for the XCC DL SF (PDCCH that schedules DL data to be transmitted through the XCC DL SF) even in a cross-CC scheduling situation.

FIG. 11 illustrates an HD-TDD CA structure. In the figure, shaded parts X show CCs that are restricted from being used in a collided SF and a dotted-line arrow represents a DL SF corresponding to an implicit PUCCH that is not linked to a PCC UL SF.

Figure 12:
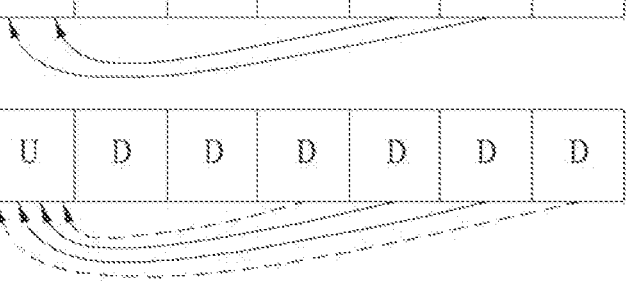
FIG. 12 illustrates an FD (full duplex)-TDD CA scheme.

In the meantime, a method of permitting simultaneous UL/DL transmission and reception in a collided SF in which link directions of a PCC and an SCC are different from each other can be considered. This method is called FD (Full Duplex)-TDD CA for convenience. In case of FD-TDD CA, it is also possible to apply the same or different A/N timings (set to Ref-Cfg) to CCs or commonly apply A/N timing set to Ref-Cfg to all CCs in order to transmit A/N feedbacks for DL SFs of all CCs through one PCC UL SF. Ref-Cfg may be identical to PCC-Cfg or SCC-Cfg or may be set as a UL-DL Cfg other than PCC-Cfg and SCC-Cfg. In an FD-TDD CA structure, M can also be set differently/independently for CCs for one PCC UL SF and an implicit PUCCH may not be defined for an XCC DL SF (for a PCC UL SF matched to the corresponding SF) even in a cross-CC scheduling situation. FIG. 12 illustrates an FD-TDD CA structure. In FIG. 12, dotted-line arrows represent DL SFs corresponding to an implicit PUCCH that is not linked to the PCC UL SF.

A description will be given of an A/N state mapping and operating method for channel selection based A/N transmission when a plurality of CCs (having different TDD UL-DL configurations) is aggregated. To aid in understanding the present invention, the following description is based on the assumption that 2 CCs (i.e. a PCC and an SCC) are aggregated. In this case, the number of A/N-DL SFs (refer to the number of elements of set K in Table 5) of CC1 (e.g. PCC or SCC) and CC2 (e.g. SCC or PCC) set to PCC UL SF n are respectively set to M1 and M2. Here, M1 and M2 may be set to different values by applying different TDD UL-DL configurations and/or Ref-Cfgs. In the following description, A denotes ACK, N denotes NACK, and D denotes data non-reception or PDCCH non-reception (i.e. DTX). D/N denotes NACK or DTX and "any" represents ACK, NACK or DTX. A maximum number of TBs that can be transmitted through a CC is defined as Ntb. Furthermore, DL data (e.g. PDSCH transmitted through SPS) transmitted without a PDCCH is called DL data w/o PDCCH for convenience. DL data may refer to a PDCCH/PDSCH that requires ACK/NACK feedback and may include a PDCCH that indicates SPS release. In addition, a DL SF can include a special SF as well as a normal DL SF.

Prior to description of the present invention, the conventional TDD CA channel selection scheme will now be described. As described above with reference to FIGS. 7 to 13, LTE-A can employ channel selection for A/N transmission when 2 CCs (e.g. a PCC and an SCC) having the same TDD UL-DL configuration are aggregated. Specifically, LTE-A considers A/N state mapping for each CC when M=1, 2, 3, 4 as follows.

M=1

When Ntb=1, ACK-rsp (1) is an A/N response to a corresponding TB.

TABLE 14

| ACK-rsp(1) |
|---|
| A |
| N/D |

When Ntb=2, ACK-rsp (i) is an A/N response to an i-th TB.

TABLE 15

| ACK-rsp(1), ACK-rsp(2) |
|---|
| A, A |
| N/D, A |
| A, N/D |
| N/D, N/D |

M=2

ACK-rsp (i) is an A/N response to DL data transmitted through an i-th DL SF.

TABLE 16

| ACK-rsp(1), ACK-rsp(2) |
|---|
| A, A |
| N/D, A |
| A, N/D |
| N/D, N/D |

M=3

Case in which DL data w/o PDCCH is not present
ACK-rsp (i) is an A/N response to DL data corresponding to a PDCCH with DAI=i.
Case in which DL data w/o PDCCH is present
ACK-rsp (1) is an A/N response to DL data w/o PDCCH and ACK-rsp(i+1) is an A/N response to DL data corresponding to PDCCH with DAI=i.

TABLE 17

| ACK-rsp(1), ACK-rsp(2), ACK-rsp(3) | Ref-state |
|---|---|
| A, A, A | A, A |
| A, A, N/D | N/D, A |
| A, N/D, any | A, N/D |
| N/D, any, any | N/D, N/D |

M=4

Case in which DL data w/o PDCCH is not present
ACK-rsp (i) is an A/N response to DL data corresponding to a PDCCH with DAI=i.
Case in which DL data w/o PDCCH is present
ACK-rsp (1) is an A/N response to DL data w/o PDCCH and ACK-rsp(i+1) is an A/N response to DL data corresponding to PDCCH with DAI=i.

TABLE 18

| ACK-rsp(1), ACK-rsp(2), ACK-rsp(3), ACK-rsp(4) | Ref-state |
|---|---|
| A, A, A, N/D | A, A |
| A, A, N/D, any | N/D, A |
| (A, D, D, D) or (A, A, A, A) | A, N/D |
| (N/D, any, any, any) or (A, N/D, any, any), except for (A, D, D, D) | N/D, N/D |

To map an A/N state for each CC in Tables 14 to 18 to a combination of (PUCCH resource, QPSK symbol), the following method is employed according to M (referred to as a basic mapping rule hereinafter).

M=1

When both CCs correspond to Ntb=1
HARQ-ACK(0) and HARQ-ACK(1) of Table 7 are respectively replaced by ACK-rsp(1) of the PCC and ACK-rsp (1) of the SCC.

When the PCC corresponds to Ntb=1 and the SCC corresponds to Ntb=2
HARQ-ACK(0), HARQ-ACK(1) and HARQ-ACK(2) of Table 8 are respectively replaced by ACK-rsp(1) of the PCC, ACK-rsp(1) and ACK-rsp(2) of the SCC.

When the PCC corresponds to Ntb=2 and the SCC corresponds to Ntb=1
HARQ-ACK(0), HARQ-ACK(1) and HARQ-ACK(2) of Table 8 are respectively replaced by ACK-rsp(1) and ACK-rsp(2) of the PCC, and ACK-rsp(1) of the SCC.

When both CCs correspond to Ntb=2
HARQ-ACK(0), HARQ-ACK(1), HARQ-ACK(2) and HARQ-ACK(3) of Table 9 are respectively replaced by ACK-rsp(1) and ACK-rsp(2) of the PCC, ACK-rsp(1) and ACK-rsp(2) of the SCC.

M=2
HARQ-ACK(0), HARQ-ACK(1), HARQ-ACK(2) and HARQ-ACK(3) of Table 9 are respectively replaced by ACK-rsp(1) and ACK-rsp(2) of the PCC, ACK-rsp(1) and ACK-rsp(2) of the SCC.

For example, when ACK-rsp(1) and ACK-rsp(2) of the PCC respectively correspond to A and N/D and ACK-rsp(1) and ACK-rsp(2) of the SCC respectively correspond to N/D and A, A/N transmission is performed using a combination of (PUCCH resource, QPSK symbol), which is selected when HARQ-ACK(0), HARQ-ACK(1), HARQ-ACK(2), HARQ-ACK(3)=(A, N/D, N/D, A) in Table 9, that is, ($n^{(1)}_{PUCCH,0}$, b(0)b(1)=0,1).

M=3
In case of the PCC, an A/N combination identical to a Ref-state corresponding to HARQ-ACK(0) and HARQ-ACK(1) of Table 9 is replaced by ACK-rsp(1), (2), (3) corresponding to the Ref-state.
In case of the SCC, an A/N combination identical to a Ref-state corresponding to HARQ-ACK(2) and HARQ-ACK(3) of Table 9 is replaced by ACK-rsp(1), (2), (3) corresponding to the Ref-state.
For example, it is assumed that ACK-rsp(1), (2), (3)=(A, A, A) and Ref-state corresponding thereto is (A, A) in case of the PCC. Furthermore, it is assumed that ACK-rsp(1), (2), (3)=(A, N/D, any) and Ref-state corresponding thereto is (A, N/D) in case of the SCC. In this case, A/N transmission is performed using a combination of (PUCCH resource, QPSK symbol), which is selected when HARQ-ACK(0), HARQ-ACK(1), HARQ-ACK(2), HARQ-ACK(3)=(A, A, A, N/D) in Table 9, that is, ($n^{(1)}_{PUCCH,2}$, b(0)b(1)=1,1).
Final channel selection mapping obtained through the above-described process corresponds to Table 12.

M=4
In case of the PCC, an A/N combination identical to a Ref-state of HARQ-ACK(0) and HARQ-ACK(1) of Table 9 is replaced by ACK-rsp(1), (2), (3), (4) corresponding to the Ref-state.
In case of the SCC, an A/N combination identical to a Ref-state of HARQ-ACK(2) and HARQ-ACK(3) of Table 9 is replaced by ACK-rsp(1), (2), (3), (4) corresponding to the Ref-state.
For example, it is assumed that ACK-rsp(1), (2), (3), (4)= (A, A, A, any) and Ref-state corresponding thereto is (N/D, A) in case of the PCC. Furthermore, it is assumed that ACK-rsp(1), (2), (3), (4)=(N/D, any, any, any) and Ref-state corresponding thereto is (N/D, N/D) in case of the SCC. In this case, A/N transmission is performed using a combination of (PUCCH resource, QPSK symbol), which is selected when HARQ-ACK(0), HARQ-ACK(1), HARQ-ACK(2), HARQ-ACK(3)=(N/D, A, N/D, N/D) in Table 9, that is, ($n^{(1)}_{PUCCH,1}$, b(0)b(1)=0, 1).
Final channel selection mapping obtained through the above-described process corresponds to Table 13.

A description will be given of a method for transmitting A/N information on uplink according to the present invention when TDD CA is employed and channel selection for A/N transmission is set. The following two schemes can be considered.

First Scheme
According to an A/N state mapping rule of the first scheme, HARQ-ACK(i) corresponding to an A/N response is generated using a value M of each CC. That is, CC1 generates HARQ-ACK(i) corresponding to an A/N response of CC1 on the basis of M1 and CC2 generates HARQ-ACK(i) corresponding to an A/N response of CC2 on the basis of M2 (refer to Tables 14 to 18). Then, HARQ-ACK(i) corresponding to the entire A/N states can be generated by connecting HARQ-ACK(i) generated for respective CCs (e.g. PCC first, SCC last) with reference to the basic mapping rule, and A/N transmission with respect to a corresponding A/N state can be performed using a (PUCCH resource, QPSK symbol) combination corresponding to the generated HARQ-ACK(i). According to the first scheme, it is possible to obtain optimized A/N feedback transmission performance according to M because HARQ-ACK(i) for each CC is generated in consideration of a value M of each CC. For reference, A/N feedback transmission performance increases as the A/N state mapping size decreases (that is, A/N feedback transmission performance is better in case of Table 8 rather than Table 9 and better in case of Table 7 rather than Table 8). For example, if M1<M2, better A/N feedback transmission performance can be obtained by generating HARQ-ACK(i) corresponding to the A/N response of CC1 on the basis of M1 instead of M2 (or a value larger than M1, which is commonly applied to CC1 and CC2) for CC1.

FIG. 13 illustrates an example of A/N transmission according to the first scheme. Although the figure illustrates A/N transmission performed by a UE, it is apparent that a corresponding operation can be carried out by a BS.

Referring to FIG. 13, the UE aggregates a plurality of CCs (e.g. CC1 and CC2) having different UL-DL configurations (refer to Table 1) (S1302). CC1 may be a PCC and CC2 may be an SCC. However, CC1 and CC2 are not limited thereto. Then, upon reception of the DL data (e.g. PDSCH, SPS release PDCCH or the like), the UE performs a process for transmitting A/N feedback for the DL data. Specifically, the UE can generate a first HARQ-ACK set based on M1 for CC1 (S1304) and generate a second HARQ-ACK set based on M2 for CC2 (S1306). Here, M1 represents the number of CC1 DL SFs (corresponding to the number of elements in set K in Table 5) corresponding to PCC UL SFs (e.g. UL SF n) for A/N transmission. Similarly, M2 represents the number of CC2 DL SFs (corresponding to the number of elements in set K in Table 5) corresponding to PCC UL SFs (e.g. UL SF n) for A/N transmission. The UE can transmit information corresponding to a third HARQ-ACK set including the first HARQ-ACK set and the second HARQ-ACK set to the BS (S1308). The information corresponding to the third HARQ-ACK set can be transmitted through a PUCCH or PUSCH based on channel selection.

Specifically, A/N state mapping for each CC according to an (M1, M2) combination and a (PUCCH resource, QPSK symbol) combination corresponding thereto can be determined as follows.

In case of (M1, M2)=(1, 2)
CC1: ACK-rsp(1) is a (spatially bundled) A/N response to DL data transmitted through CC1.

TABLE 19

| ACK-rsp(1) |
| --- |
| A |
| N/D |

CC2: ACK-rsp(i) is an A/N response to DL data transmitted through an i-th DL SF of CC2.

TABLE 20

| ACK-rsp(1), ACK-rsp(2) | Ref-state |
|---|---|
| A, A | A, A |
| N/D, A | N/D, A |
| A, N/D | A, N/D |
| N/D, N/D | N/D, N/D |

In case of CC1=PCC
HARQ-ACK(0), HARQ-ACK(1) and HARQ-ACK(2) of Table 8 are respectively replaced by ACK-rsp(1) of CC1, ACK-rsp(1) and ACK-rsp(2) of CC2 and mapped.
In case of CC2=PCC
HARQ-ACK(0), HARQ-ACK(1) and HARQ-ACK(2) of Table 8 are respectively replaced by ACK-rsp(1) and ACK-rsp(2) of CC2 and ACK-rsp(1) of CC1 and mapped.
When CC1 corresponds to Ntb=2, spatial bundling may not be applied to CC1.
In this case, A/N responses ACK-rsp(1) and ACK-rsp(2) to each TB of DL data transmitted through CC1 and ACK-rsp(1) and ACK-rsp(2) of CC2 are connected according to a rule (e.g. PCC first, SCC last) and replace HARQ-ACK(0), HARQ-ACK(1), HARQ-ACK(2) and HARQ-ACK(3) of Table 9, and then are mapped.
In case of (M1, M2)=(1, 3) [Alt 1]
CC1: ACK-rsp(1) is a (spatially bundled) A/N response to DL data transmitted through CC1.

TABLE 21

| ACK-rsp(1) |
|---|
| A |
| N/D |

CC2: ACK-rsp(i) is an A/N response to DL data corresponding to DAI-i (when DL data w/o PDCCH is not present), or ACK-rsp(1) is an A/N response to DL data w/o PDCCH and ACK-rsp(i+1) is an A/N response to DL data corresponding to DAI=i (when DL data w/o PDCCH is present).

TABLE 22

| ACK-rsp(1), ACK-rsp(2), ACK-rsp(3) | Ref-state |
|---|---|
| A, A, A | A, A |
| A, A, N/D | N/D, A |
| A, N/D, any | A, N/D |
| N/D, any, any | N/D, N/D |

Here, ACK-rsp(1), (2), (3)=(N, any, any) can correspond to Ref-state (N, N) or Ref state (N, N/D) and ACK-rsp(1), (2), (3)=(D, any, any) can correspond to Ref-state (D, D) or Ref-state (D, N/D).
When CC1=PCC
In the case of CC1, HARQ-ACK(0) of Table 8 is replaced by ACK-rsp(1) and mapped.
In the case of CC2, an A/N combination identical to Ref-state corresponding to HARQ-ACK(1) and HARQ-ACK(2) of Table 8 is replaced by ACK-rsp(1), ACK(rsp(2) and ACK-rsp(3) corresponding to the Ref-state and mapped.
When CC2=PCC
In the case of CC1, HARQ-ACK(2) of Table 8 is replaced by ACK-rsp(1) and mapped.
In the case of CC2, an A/N combination identical to Ref-state corresponding to HARQ-ACK(0) and HARQ-ACK(1) of Table 8 is replaced by ACK-rsp(1), ACK(rsp(2) and ACK-rsp(3) corresponding to the Ref-state and mapped.
When CC1 corresponds to Ntb=2, spatial bundling may not be applied to CC1.
In this case, A/N responses ACK-rsp(1) and ACK-rsp(2) to each TB of DL data transmitted through CC1 and ACK-rsp(1), ACK-rsp(2) and ACK-rsp(3) of CC2 are connected according to the basic mapping rule and a connection rule (e.g. PCC first, SCC last) and replace HARQ-ACK(0), HARQ-ACK(1), HARQ-ACK(2) and HARQ-ACK(3) of Table 9, and then are mapped.
In case of (M1, M2)=(1, 3) [Alt 2]
CC1: ACK-rsp(1) is a (spatially bundled) A/N response to DL data transmitted through CC1.

TABLE 23

| ACK-rsp(1) |
|---|
| A |
| N/D |

CC2: ACK-rsp(i) is an A/N response to DL data transmitted through the i-th DL SF of CC2.

TABLE 24

| ACK-rsp(1), ACK-rsp(2), ACK-rsp(3) |
|---|
| A, A, A |
| A, A, N/D |
| A, N/D, A |
| A, N/D, N/D |
| N/D, A, A |
| N/D, A, N/D |
| N/D, N/D, A |
| N/D, N/D, N/D |

In case of CC1=PCC
HARQ-ACK(0), HARQ-ACK(1), HARQ-ACK(2) and HARQ-ACK(3) of Table 9 are respectively replaced by ACK-rsp(1) of CC1, ACK-rsp(1), ACK-rsp(2) and ACK-rsp(3) of CC2 and mapped.
In case of CC2=PCC
HARQ-ACK(0), HARQ-ACK(1), HARQ-ACK(2) and HARQ-ACK(3) of Table 9 are respectively replaced by ACK-rsp(1), ACK-rsp(2) and ACK-rsp(3) of CC2 and ACK-rsp(1) of CC1 and mapped.
In case of (M1, M2)=(1, 4)
CC1: ACK-rsp(1) is a (spatially bundled) A/N response to DL data transmitted through CC1.

TABLE 25

| ACK-rsp(1) |
|---|
| A |
| N/D |

CC2: ACK-rsp(i) is an A/N response to DL data corresponding to DAI-i (when DL data w/o PDCCH is not present), or ACK-rsp(1) is an A/N response to DL data w/o PDCCH and ACK-rsp(i+1) is an A/N response to DL data corresponding to DAI=i (when DL data w/o PDCCH is present).

TABLE 26

| ACK-rsp(1), ACK-rsp(2), ACK-rsp(3), ACK-rsp(4) | Ref-state |
|---|---|
| A, A, A, N/D | A, A |
| A, A, N/D, any | N/D, A |
| (A, D, D, D) or (A, A, A, A) | A, N/D |
| (N/D, any, any, any) or (A, N/D, any, any), except for (A, D, D, D) | N/D, N/D |

Here, ACK-rsp(1), (2), (3), (4)=(N, any, any, any) or (A, N/D, any, any) except for (A, D, D, D) can correspond to Ref-state (N, N) or Ref state (N, N/D) and ACK-rsp(1), (2), (3), (4)=(D, any, any, any) can correspond to Ref-state (D, D) or Ref-state (D, N/D).

When CC1=PCC

In the case of CC1, HARQ-ACK(0) of Table 9 is replaced by ACK-rsp(1) and mapped.

In the case of CC2, an A/N combination identical to Ref-state corresponding to HARQ-ACK(1) and HARQ-ACK(2) of Table 9 is replaced by ACK-rsp(1), ACK(rsp (2), ACK-rsp(3) and ACK-rsp(4) corresponding to the Ref-state and mapped.

When CC2=PCC

In the case of CC1, HARQ-ACK(2) of Table 9 is replaced by ACK-rsp(1) and mapped.

In the case of CC2, an A/N combination identical to Ref-state corresponding to HARQ-ACK(0) and HARQ-ACK(1) of Table 9 is replaced by ACK-rsp(1), ACK(rsp (2), ACK-rsp(3) and ACK-rsp(4) corresponding to the Ref-state and mapped.

When CC1 corresponds to Ntb=2, spatial bundling may not be applied to CC1.

In this case, A/N responses ACK-rsp(1) and ACK-rsp(2) to each TB of DL data transmitted through CC1 and ACK-rsp(1), ACK-rsp(2), ACK-rsp(3) and ACK-rsp(4) of CC2 are connected according to the basic mapping rule and a connection rule (e.g. PCC first, SCC last) and replace HARQ-ACK(0), HARQ-ACK(1), HARQ-ACK(2) and HARQ-ACK(3) of Table 10, and then are mapped.

In case of (M1, M2)=(2, 3)

CC1: ACK-rsp(i) is an A/N response to DL data transmitted the i-th DL SF of CC1.

TABLE 27

| ACK-rsp(1), ACK-rsp(2) |
|---|
| A, A |
| N/D, A |
| A, N/D |
| N/D, N/D |

CC2: ACK-rsp(i) is an A/N response to DL data corresponding to DAI-i (when DL data w/o PDCCH is not present), or ACK-rsp(1) is an A/N response to DL data w/o PDCCH and ACK-rsp(i+1) is an A/N response to DL data corresponding to DAI=i (when DL data w/o PDCCH is present).

TABLE 28

| ACK-rsp(1), ACK-rsp(2), ACK-rsp(3) | Ref-state |
|---|---|
| A, A, A | A, A |
| A, A, N/D | N/D, A |
| A, N/D, any | A, N/D |
| N/D, any, any | N/D, N/D |

Here, ACK-rsp(1), (2), (3)=(N, any, any) can correspond to Ref-state (N, N) or Ref state (N, N/D) and ACK-rsp(1), (2), (3)=(D, any, any) can correspond to Ref-state (D, D) or Ref-state (D, N/D).

When CC1=PCC

In the case of CC1, HARQ-ACK(0) and HARQ-ACK(1) of Table 9 are respectively replaced by ACK-rsp(1) and ACK-rsp(2) and mapped.

In the case of CC2, an A/N combination identical to Ref-state corresponding to HARQ-ACK(2) and HARQ-ACK(3) of Table 9 is replaced by ACK-rsp(1), ACK(rsp (2) and ACK-rsp(3) corresponding to the Ref-state and mapped.

When CC2=PCC

In the case of CC1, HARQ-ACK(2) and HARQ-ACK(3) of Table 9 are respectively replaced by ACK-rsp(1) and ACK-rsp(2) and mapped.

In the case of CC2, an A/N combination identical to Ref-state corresponding to HARQ-ACK(0) and HARQ-ACK(1) of Table 9 is replaced by ACK-rsp(1), ACK(rsp (2) and ACK-rsp(3) corresponding to the Ref-state and mapped.

In case of (M1, M2)=(2, 4)

CC1: ACK-rsp(i) is an A/N response to DL data transmitted on the i-th DL SF of CC1.

TABLE 29

| ACK-rsp(1), ACK-rsp(2) |
|---|
| A, A |
| N/D, A |
| A, N/D |
| N/D, N/D |

CC2: ACK-rsp(i) is an A/N response to DL data corresponding to DAI-i (when DL data w/o PDCCH is not present), or ACK-rsp(1) is an A/N response to DL data w/o PDCCH and ACK-rsp(i+1) is an A/N response to DL data corresponding to DAI=i (when DL data w/o PDCCH is present).

TABLE 30

| ACK-rsp(1), ACK-rsp(2), ACK-rsp(3), ACK-rsp(4) | Ref-state |
|---|---|
| A, A, A, N/D | A, A |
| A, A, N/D, any | N/D, A |
| (A, D, D, D) or (A, A, A, A) | A, N/D |
| (N/D, any, any, any) or (A, N/D, any, any), except for (A, D, D, D) | N/D, N/D |

Here, ACK-rsp(1), (2), (3), (4)=(N, any, any, any) or (A, N/D, any, any) except for (A, D, D, D) can correspond to Ref-state (N, N) or Ref state (N, N/D) and ACK-rsp(1), (2), (3), (4)=(D, any, any, any) can correspond to Ref-state (D, D) or Ref-state (D, N/D).

When CC1=PCC

In the case of CC1, HARQ-ACK(0) and HARQ-ACK(1) of Table 9 are respectively replaced by ACK-rsp(1) and ACK-rsp(2) and mapped.

In the case of CC2, an A/N combination identical to Ref-state corresponding to HARQ-ACK(2) and HARQ-ACK(3) of Table 9 is replaced by ACK-rsp(1), ACK(rsp (2), ACK-rsp(3) and ACK-rsp(4) corresponding to the Ref-state and mapped.

When CC2=PCC

In the case of CC1, HARQ-ACK(2) and HARQ-ACK(3) of Table 9 are respectively replaced by ACK-rsp(1) and ACK-rsp(2) and mapped.

In the case of CC2, an A/N combination identical to Ref-state corresponding to HARQ-ACK(0) and HARQ-ACK(1) of Table 9 is replaced by ACK-rsp(1), ACK(rsp(2), ACK-rsp(3) and ACK-rsp(4) corresponding to the Ref-state and mapped.

In case of (M1, M2)=(3, 4)

CC1: ACK-rsp(i) is an A/N response to DL data corresponding to DAI-i (when DL data w/o PDCCH is not present), or ACK-rsp(1) is an A/N response to DL data w/o PDCCH and ACK-rsp(i+1) is an A/N response to DL data corresponding to DAI=i (when DL data w/o PDCCH is present).

TABLE 31

| ACK-rsp(1), ACK-rsp(2), ACK-rsp(3) | Ref-state |
|---|---|
| A, A, A | A, A |
| A, A, N/D | N/D, A |
| A, N/D, any | A, N/D |
| N/D, any, any | N/D, N/D |

Here, ACK-rsp(1), (2), (3)=(N, any, any) can correspond to Ref-state (N, N) or Ref state (N, N/D) and ACK-rsp(1), (2), (3)=(D, any, any) can correspond to Ref-state (D, D) or Ref-state (D, N/D).

CC2: ACK-rsp(i) is an A/N response to DL data corresponding to DAI-i (when DL data w/o PDCCH is not present), or ACK-rsp(1) is an A/N response to DL data w/o PDCCH and ACK-rsp(i+1) is an A/N response to DL data corresponding to DAI=i (when DL data w/o PDCCH is present).

TABLE 32

| ACK-rsp(1), ACK-rsp(2), ACK-rsp(3), ACK-rsp(4) | Ref-state |
|---|---|
| A, A, A, N/D | A, A |
| A, A, N/D, any | N/D, A |
| (A, D, D, D) or (A, A, A, A) | A, N/D |
| (N/D, any, any, any) or (A, N/D, any, any), except for (A, D, D, D) | N/D, N/D |

Here, ACK-rsp(1), (2), (3), (4)=(N, any, any, any) or (A, N/D, any, any) except for (A, D, D, D) can correspond to Ref-state (N, N) or Ref state (N, N/D) and ACK-rsp(1), (2), (3), (4)=(D, any, any, any) can correspond to Ref-state (D, D) or Ref-state (D, N/D).

When CC1=PCC

In the case of CC1, an A/N combination identical to Ref-state corresponding to HARQ-ACK(0) and HARQ-ACK(1) of Table 9 is replaced by ACK-rsp(1), ACK(rsp(2) and ACK-rsp(3) corresponding to the Ref-state and mapped.

In the case of CC2, an A/N combination identical to Ref-state corresponding to HARQ-ACK(2) and HARQ-ACK(3) of Table 9 is replaced by ACK-rsp(1), ACK(rsp(2), ACK-rsp(3) and ACK-rsp(4) corresponding to the Ref-state and mapped.

When CC2=PCC

In the case of CC1, an A/N combination identical to Ref-state corresponding to HARQ-ACK(2) and HARQ-ACK(3) of Table 9 is replaced by ACK-rsp(1), ACK(rsp(2), ACK-rsp(3) and ACK-rsp(4) corresponding to the Ref-state and mapped.

In the case of CC2, an A/N combination identical to Ref-state corresponding to HARQ-ACK(0) and HARQ-ACK(1) of Table 9 is replaced by ACK-rsp(1), ACK(rsp(2), ACK-rsp(3) and ACK-rsp(4) corresponding to the Ref-state and mapped.

Second Scheme

Alternatively, it is possible to consider a scheme for mapping A/N states by commonly applying the basic mapping rule and a connection rule (e.g. PCC first, SCC last) to CC1 and CC2 on the basis of M=max(M1, M2) and determining a (PUCCH resource, QPSK symbol) combination corresponding thereto. Specifically, HARQ-ACKs(i) corresponding to A/N responses of CCs can be generated on the basis of a common value of M (by applying the basis mapping rule to the CCs) and connected to generate HARQ-ACK(i) for all A/N states. ACK-rsp(i) with respect to each CC can be set to a value defined according to M (refer to Tables 14 to 18). Accordingly, when M1<M2, an A/N response to CC1 is given as ACK-rsp(i) (i=1 to M2) (HARQ-ACK(i) corresponding thereto) based on M2. However, there is no actual DL data transmission corresponding to ACK-rsp(i) (i=M1+1 to M2) (HARQ-ACK(i) corresponding thereto), and thus HARQ-ACK(i) can be processed as DTX. Then, A/N transmission can be performed using (PUCCH resource, QPSK symbol) combinations corresponding to all A/N states. In other words, definition of A/N state mapping and HARQ-ACK(i) relating thereto in Tables 7, 8, 9, 12 and 13, definition of PUCCH resource, etc. can be commonly applied to CC1 and CC2 according to M=max(M1, M2).

According to scheme 1, while improved A/N feedback transmission performance can be achieved, it is necessary to newly define A/N state mapping (definition of HARQ-ACK(i) related to A/N state mapping and a PUCCH resource allocation scheme are diversified) for every case in which M1 and M2 are different from each other, and thus system complexity may increase and the existing A/N state mapping rule cannot be reused. According to scheme 2, it is possible to reduce system complexity by applying a common value of N to a plurality of CCs and to reuse the existing A/N state mapping scheme without newly configuring an A/N state mapping scheme for each (M1, M2) combination.

FIG. 14 illustrates an example of A/N transmission according to scheme 2. Although the figure illustrates A/N transmission as being performed by a UE, it is apparent that a corresponding operation can be carried out by a BS.

Referring to FIG. 14, the UE aggregates a plurality of CCs (e.g. CC1 and CC2) having different UL-DL configurations (refer to Table 1) (S1402). CC1 may be a PCC and CC2 may be an SCC. However, CC1 and CC2 are not limited thereto. Then, upon reception of DL data (e.g. PDSCH, SPS release PDCCH or the like), the UE performs a process for transmitting A/N feedback for the DL data. Specifically, the UE can generate a first HARQ-ACK set based on a value M for CC1 (S1404) and generate a second HARQ-ACK set based on the same value M for CC2 (S1406). Here, M1 represents the number of CC1 DL SFs (corresponding to the number of elements in set K in Table 5) corresponding to PCC UL SFs (e.g. UL SF n) for A/N transmission. Similarly, M2 represents the number of CC2 DL SFs (corresponding to the number of elements in set K in Table 5) corresponding to PCC UL SFs (e.g. UL SF n) for A/N transmission. M is set as M=max(M1, M2), which represents a value that is not a smaller one between M1 and M2. That is, an A/N state for each CC is generated on the basis of the common value of M applied to both CC1 and CC2. Specifically, the A/N state for each CC can be given according to Tables 14 to 18. When M1<M2, the first HARQ-ACK set for CC1 can include M2 HARQ-ACK responses (i.e. HARQ-ACK(0) to HARQ-ACK(M2−1)) and M2-M1 HARQ-ACK responses (i.e. HARQ-ACK(M1) to HARQ-ACK(M2−1)) at the back of the first HARQ-ACK set can be set as DTX. When M1>M2, the first HARQ-ACK set for CC1 is configured in a similar manner. The UE can transmit information corresponding to a third HARQ-ACK set (refer to Tables 7, 8, 9, 12 and 13) including the first HARQ-ACK set and the second HARQ-ACK set to the BS (S1408). The information corresponding to the third HARQ-ACK set can be transmitted through a PUCCH or PUSCH based on channel selection.

When the scheme based on M=max(M1, M2) is applied to (M1, M2)=(2, 3), significant A/N states (ACK-rsp(1), ACK-rsp(2) and ACK-rsp(3)) for CC1 correspond to (A, A, N/D) and (A, N/D, any). Referring to Table 17, while A/N states for each CC correspond to {(A,A,A), (A,A,N/D), (A,N/D, any), (N/D, any, any)} when M=3, the third A/N response is D in the case of CC1, and thus significant A/N states for CC1 are (A, A, N/D) and (A, N/D, any) because (A, A, A) is not available and the second A/N state of (N/D, any, any) cannot be known. In other words, only information about (A, A) and (A, N/D) from among all A/N states {(A,A), (A, N/D), (N/D, A), (N/D, N/D)} regarding DL data corresponding to DAI=1 and DAI=2 (or DL data w/o PDCCH and DAI=1) that can be present on CC1 is available for A/N transmission. When the scheme based on M=max(M1, M2) is applied to (M1, M2)= (2, 4), significant A/N states (ACK-rsp(1), ACK-rsp(2), ACK-rsp(3) and ACK-rsp(4)) for CC1 correspond to only (A, A, N/D, any) and (A, D, D, D). Referring to Table 18, while A/N states for each CC correspond to {(A,A,A, N/D), (A,A,N/D, any), [(A, A, A, A) or (A, D, D, D)], [(N/D, any, any, any) or (A, N/D, any, any) except for (A, D, D, D)]} when M=4, the third and fourth A/N responses are all D in the case of CC1, and thus significant A/N states for CC1 are (A, A, N/D, any) and (A, D, D, D) because A/N states other than (A, A, N/D, any) and (A, D, D, D) are available or unknown. In other words, only information about (A, A) and (A, D) from among all A/N states regarding DL data corresponding to DAI=1 and DAI=2 (or DL data w/o PDCCH and DAI=1) that can be present on CC1 is available for A/N transmission. Accordingly, in case of M=4 based mapping, some A/N information (i.e. (A, N)) about CC1 may be unnecessarily lost due to overlap A/N state mapping.

Therefore, when the scheme based on M=max(M1, M2) is applied to (M1, M2)=(2, 4), A/N mapping can be modified to reduce unnecessary A/N information loss (with respect to CC1) caused by A/N state overlap in M=4 based mapping. Specifically, (A, N/D) from among A/N states corresponding to DAI=1 and DAI=2 on CC1 (or DL data w/o PDCCH and DAI=1) may be mapped to ACK-rsp(1), (2), (3), (4)="(A, D, D, D) or (A, A, A, A)" in Table 18 and A/N transmission may be performed using a (PUCCH resource, QPSK symbol) combination corresponding thereto in Table 13 (that is, A/N transmission is performed considering that HARQ-ACK(1), (2), (3), (4)="(A, D, D, D) or (A, A, A, A)" in Table 13). Accordingly, only (N/D, A) and (N/D, N/D) from among A/N states corresponding to DAI=1 and DAI=2 on CC1 (or DL data w/o PDCCH and DAI=1) can be mapped to ACK-rsp(1), (2), (3), (4)="(N/D, any, any, any) or (A, N/D, any, any), except for (A, D, D, D)" in Table 18 (that is, HARQ-ACK(1), (2), (3), (4) are regarded as "(N/D, any, any, any) or (A, N/D, any, any), except for (A, D, D, D) in M=4 based mapping of Table 13).

The above-described A/N state mapping scheme can be equally applied to a case in which (M1, M2)=(2, 4) and A/N is piggybacked on a PUSCH, a case in which a UL DAI value corresponding to the PUSCH is 4 and/or a case in which a UL DAI corresponding to the PUSCH is not present (e.g. SPS based PUSCH). Specifically, RM code input bits corresponding to A/N piggyback information can be generated according to the proposed M=4 based A/N state mapping scheme (refer to Tables 12 and 13) and transmitted through a PUSCH. Here, the UL DAI is signaled through a UL grant PDCCH that schedules the PUSCH.

When (M1, M2)=(L, 0) (L being a positive integer excluding 0), it is also possible to consider the method of generating HARQ-ACKs(i) corresponding to A/N responses to CCs and connecting HARQ-ACKs(i) on the basis of a value of M=L (=max(M1, M2)) to generate HARQ-ACK(i) for all A/N states and determining a (PUCCH resource, QPSK symbol) combination corresponding thereto. ACK-rsp(i) of each CC correspond to a value defined as M (=L), and ACK-rsp(i) (HARQ-ACK(i) corresponding thereto) with respect to CC2 when M2=0 can be processed as DTX because it is not defined.

In case of (M1, M2)=(L, 0), when the above-described connection rule (PCC first, SCC last) is applied to an A/N response (HARQ-ACK(i) corresponding thereto) generated for each CC without modification to configure all A/N states (HARQ-ACK(i) corresponding thereto), throughput and/or A/N feedback performance may be deteriorated in a specific situation. For example, if (CC1, CC2)=(SCC, PCC), (M1, M2)=(L=1, 0) and Ntb=1, A/N feedback transmission can be performed when an A/N response to the SCC is ACK whereas A/N feedback transmission cannot be performed when the A/N response to the SCC is NACK (instead of DTX). This is because a (PUCCH resource, QPSK symbol) combination corresponding to (DTX, NACK) in Table 7 is not present (that is, no transmission) while all A/N states are configured as (PCC, SCC)=(DTX, NACK) since ACK-rsp(i) (HARQ-ACK (i) corresponding thereto) for the PCC is always DTX.

Accordingly, the present invention additionally proposes a method of generating HARQ-ACK(i) for all A/N states by applying a modified connection rule (CC1 first, CC2 last) to the A/N response (HARQ-ACK(i) corresponding thereto) generated for each CC on the basis of the value M=L (=max (M1, M2)) when (M1, M2)=(L, 0) (by employing the basic mapping rule). Here, CC1 denotes a CC having a number (i.e. Mc) of A/N-DL SFs, which is not 0, and CC2 denotes a CC having a (i.e. Mc) of A/N-DL SFs, which is 0. In this case, an A/N state corresponding to the PCC and a PUCCH resource linked thereto in Tables 7, 8, 9, 12 and 13 can be mapped to an A/N state corresponding to CC1 and a PUCCH resource linked thereto, and a (PUCCH resource, QPSK symbol) combination corresponding to all A/N states is determined on the basis of the A/N state and the PUCCH resource. Here, an A/N state and PUCCH resource corresponding to the SCC in Tables 7, 8, 9, 12 and 13 can be mapped to an A/N state (i.e. DTX) and PUCCH resource (which is not present) corresponding to CC2. That is, an A/N response to a CC having a number (i.e. Mc) of A/N-DL SFs, which is not 0, is arranged first in all A/N states and the (PUCCH resource, QPSK symbol) combination corresponding to the entire A/D states is determined based thereon.

The present invention proposes a method of configuring ACK-rsp(i)-to-Ref-state mapping based on Table 16, 17 and 18 only for CC1 when (M1, M2)=(L, 0) and L=2, 3, 4, replacing an A/N combination identical to a Ref-state corresponding to HARQ-ACK(0) and HARQ(1) of Table 7 by ACK-rsp(i) corresponding to the Ref-state and mapping ACK-rsp(i). Here, $n^{(1)}_{PUCCH,0}$ and $n^{(1)}_{PUCCH,1}$ can be allocated to PUCCH resources linked/corresponding to CC1. For example, the PUCCH resources linked/corresponding to CC1 include PUCCH resources linked to DL data transmitted through first and second DL SFs of CC1 when L=2 or include PUCCH resources linked to DL data corresponding to DAI=1, 2 (or DL data w/o PDCCH, DAI=1) when L=3, 4.

In addition, the present invention proposes a scheme of regarding a value of Ntb of CC2 as 1 all the time irrespective of a transmission mode set to CC2, that is, the maximum number of transmittable TBs when (M1, M2)=(L, 0) and L=1 (without spatial bundling). This scheme is based on the fact that A/N feedback transmission performance is improved as the A/N state mapping size decreases (that is, better A/N feedback transmission performance is achieved in case of Table 8 rather than Table 9 and better A/N feedback transmission performance is achieved in case of Table 7 rather than Table 8). Accordingly, A/N feedback information can be mapped to an AN state in which HARQ-ACK(0) or HARQ-ACK(0) and HARQ-ACK(1) correspond to CC1 all the time in Table 10.

Alternatively, it is possible to consider a method of configuring A/N states using PUCCH format 1a/1b (L=1) (without application of spatial bundling) or using Table 7 (L=2), Table 8 (L=3) or Table 9 (L=4) (with application of spatial bundling) only for CC1 according to a value L when (M1, M2)= (L, 0) and determining (PUCCH resource, QPSK symbol) combinations corresponding to the A/N states. In this case, HARQ-ACK(i) and $n^{(1)}_{PUCCH,i}$ in Tables 7, 8 and 9 respectively denote an A/N response to DL data transmitted through an (i+1)th DL SF of CC1 and a PUCCH resource linked/corresponding to the A/N response. Spatial bundling may not be applied when L=2, and Tables 7 and 9 can be respectively applied to 2-bit A/N in case of Ntb=1 and 4-bit A/N in case of Ntb=2. Here, HARQ-ACK(0), HARQ-ACK(1), HARQ-ACK(2) and HARQ-ACK(3) can respectively denote A/N responses to a first TB transmitted through the first DL SF on CC1, a second TB transmitted through the first DL SF, a first TB transmitted through the second DL SF on CC1 and a second TB transmitted through the second DL SF.

A special SF (S SF) (corresponding to S SF configuration #0 in Table 2, for example) in which DwPTS period is configured of less than N (e.g. N=3) OFDM symbols may be allocated. In this case, when the S SF is set to a PCC (i.e. PCell), a PDCCH (which requires only 1-bit A/N feedback) that indicates SPS releases through the S SF can be transmitted. When the S SF is set to an SCC (i.e. SCell), any PDCCH/DL data that requires A/N feedback may not be transmitted through the S SF. Accordingly, when an S SF (referred to as a shortest S SF for convenience) having a short DwPTS period is set to the PCell, A/N corresponding to the shortest S SF can be allocated to 1 bit all the time irrespective of a value of Ntb set to the PCell, or the shortest S SF can be excluded from A/N-DL SFs for determining M. In this case, the UE can consider that a PDCCH that indicates SPS release is not transmitted through the S SF (and thus a PDCCH monitoring process (e.g. blind decoding) can be skipped in the PCell S SF). When the shortest S SF is set to the SCell, the S SF can be excluded from A/N-DL SFs for determining M. Alternatively, in case of PCell, Ntb-bit (e.g. in case of M=1) according to a value of Ntb set to the PCell or 1-bit (e.g. in case of M>1) when spatial bundling is applied can be allocated to A/N corresponding to the shortest S SF. In case of SCell, the shortest S SF can be excluded from A/N-DL SFs for determining M.

In addition, 1-bit may always be allocated to A/N corresponding to the shortest S SF set to the PCell irrespective of a value of Ntb set to the PCell without excluding the shortest S SF from A/N-DL SFs. In this case, the following A/N bit allocation scheme can be performed for a specific value of M when PCell is set to Ntb=2. Values of M for the PCell and SCell are respectively defined as Mp and Ms for convenience. In addition, the numbers of A/N bits corresponding to the PCell and SCell are respectively defined as Np and Ns. It is assumed that at least A/N-DL-SFs corresponding to Mp include the shortest S SF.

1) When Mp=1
  A. Np=1
  B. Ntb of the PCell is regarded as 1 only for Mp, and then the proposed method for (M1, M2)=(1, 0), (1, 1), (1, 2), (1, 3) or (1, 4) is applied.
2) When Mp=2 and Ms=0 (option 1)
  A. Np=2 (spatial bundling is applied) and Ns=0
  B. The proposed method for (M1, M2)=(2, 0) is applied.
3) When Mp=2 and Ms=0 (option 2)
  A. Np=3 (1 bit for the shortest S SF and 2 bits for a normal DL SF) and Ns=0
  B. Channel selection for 3-bit A/N is employed using Table 8 without applying spatial bundling.
4) When Mp=2, Ms=1 and Ntb=1 for SCell (option 1)
  A. Np=2 (spatial bundling is applied) and Ns=1
  B. The proposed method for (M1, M2)=(1, 2) is applied.
5) When Mp=2, Ms=1 and SCell is set to Ntb=1 (option 2)
  A. Np=3 (1 bit for the shortest S SF and 2 bits for a normal DL SF) and Ns=1
  B. Channel selection for 4-bit A/N is employed using Table 8 without applying spatial bundling.
6) When Mp=2, Ms=1 and SCell is set to Ntb=2 (option 1)
  A. Np=2 (spatial bundling is applied) and Ns=1 (spatial bundling is applied)
  B. The proposed method for (M1, M2)=(1, 2) is applied.
7) When Mp=2, Ms=1 and SCell is set to Ntb=2 (option 2)
  A. Np=2 (spatial bundling is applied) and Ns=2
  B. The proposed method for (M1, M2)=(1, 2) is applied.

Even when the PCell and SCell have the same TDD DL-UL configuration, the proposed methods can be employed on the basis of the above-described scheme (that is, A/N corresponding to the shortest S SF is allocated to 1 bit all the time or the shortest S SF is excluded from A/N-DL SFs (when M is determined)) when the shortest S SF is set.

Figure 15:
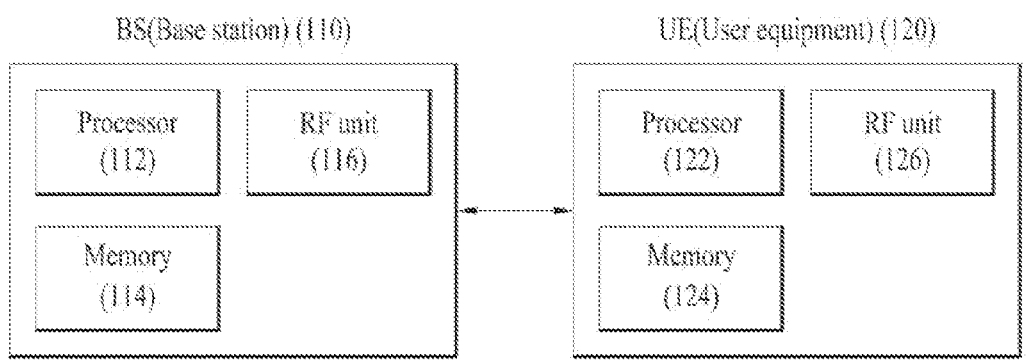
FIG. 15 illustrates a base station (BS) and a user equipment (UE) applicable to an embodiment of the present invention.

FIG. 15 illustrates a BS and a UE applicable to an embodiment of the present invention. When a wireless communication system includes a relay, communication is performed between a BS and the relay on a backhaul link and between the relay and a UE on an access link. The BS or UE shown in FIG. 16 can be replaced by a relay as necessary.

Referring to FIG. 15, an RF communication system includes a BS 110 and a UE 120. The BS 110 includes a processor 112, a memory 114 and an RF unit 116. The processor 112 may be configured to implement the procedures and/or methods proposed by the present invention. The memory 114 is connected to the processor 112 and stores various types of information relating to operations of the processor 112. The RF unit 116 is connected to the processor 112 and transmits and/or receives RF signals. The UE 120 includes a processor 122, a memory 124 and an RF unit 126. The processor 122 may be configured to implement the procedures and/or methods proposed by the present invention. The memory 124 is connected to the processor 122 and stores various types of information relating to operations of the processor 122. The RF unit 126 is connected to the processor 122 and transmits and/or receives RF signals. The BS 110 and the UE 120 may have a single antenna or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a description is given, centering on a data transmission and reception relationship between a BS and a UE. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc. The term 'UE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to wireless communication apparatuses such as a UE, a relay, a BS, etc.

What is claimed is:

1. A method for transmitting by a user equipment (UE) uplink control information in a wireless communication system operating in a time division duplex (TDD) and supporting carrier aggregation of a plurality of cells including a first cell and a second cell, the method comprising:
based on the first cell and the second cell having different uplink-downlink (UL-DL) configurations, determining a value M as a largest value of M1 or M2, M1 being a value according to an UL-DL configuration of the first cell and M2 being a value according to an UL-DL configuration of the second cell;
obtaining hybrid automatic repeat request-acknowledgment (HARQ-ACK) responses for the first cell and the second cell using the value M; and
transmitting at least one bit value corresponding to the obtained HARQ-ACK responses in an uplink subframe.

2. The method according to claim 1, wherein the value M is determined by M=max(M1, M2), max(M1, M2) indicating the largest value of M1 or M2.

3. The method according to claim 1, wherein:
M1 corresponds to a number of downlink subframes corresponding to the uplink subframe in the first cell, and
M2 corresponds to a number of downlink subframes corresponding to the uplink subframe in the second cell.

4. The method according to claim 1, wherein the first cell is a primary cell (PCell) and the second cell is a secondary cell (SCell).

5. The method according to claim 1, wherein, based on M being greater than M1, (M−M1) HARQ-ACK responses for the first cell are set to discontinuous transmissions (DTX).

6. The method according to claim 1, wherein, based on M being greater than M2, (M−M2) HARQ-ACK responses for the second cell are set to discontinuous transmissions (DTX).

7. The method according to claim 1, wherein the at least one bit value is transmitted via a physical uplink control channel (PUCCH) using a specific PUCCH resource corresponding to the obtained HARQ-ACK responses from among a plurality of PUCCH resources.

8. The method according to claim 1, wherein the at least one bit value is transmitted via a physical uplink shared channel (PUSCH).

9. A communication device configured to transmit uplink control information in a wireless communication system operating in a time division duplex (TDD) and supporting carrier aggregation of a plurality of cells including a first cell and a second cell, the communication device comprising:
a radio frequency (RF) transceiver; and
a processor configured to:
based on the first cell and the second cell having different uplink-downlink (UL-DL) configurations, determine a value M as a largest value of M1 or M2, M1 being a value according to an UL-DL configuration of the first cell and M2 being a value according to an UL-DL configuration of the second cell,
obtain hybrid automatic repeat request-acknowledgment (HARQ-ACK) responses for the first cell and the second cell using the value M, and
transmit at least one bit value corresponding to the obtained HARQ-ACK responses in an uplink subframe.

10. The communication device according to claim 9, wherein the value M is determined by M=max(M1, M2), max(M1, M2) indicating the largest value of M1 or M2.

11. The communication device according to claim 9, wherein:
M1 corresponds to a number of downlink subframes corresponding to the uplink subframe in the first cell, and
M2 corresponds to a number of downlink subframes corresponding to the uplink subframe in the second cell.

12. The communication device according to claim 9, wherein the first cell is a primary cell (PCell) and the second cell is a secondary cell (SCell).

13. The communication device according to claim 9, wherein, based on M being greater than M1, (M−M1) HARQ-ACK responses for the first cell are set to discontinuous transmissions (DTX).

14. The communication device according to claim 9, wherein, based on M being greater than M2, (M−M2) HARQ-ACK responses for the second cell are set to discontinuous transmissions (DTX).

15. The communication device according to claim 9, wherein the at least one bit value is transmitted via a physical uplink control channel (PUCCH) using a specific PUCCH resource corresponding to the HARQ-ACK responses from among a plurality of PUCCH resources.

16. The communication device according to claim 9, wherein the at least one bit value is transmitted via a physical uplink shared channel (PUSCH).

* * * * *